Oct. 29, 1968 T. STUTZ 3,408,484

ARRANGEMENT FOR COUNTING SIGNALS OF SPECIFIC SIGNIFICANCE

Filed Aug. 24, 1964 11 Sheets-Sheet 1

*Inventors:*
*Theo Stutz*

*By*
*Michael S. Striker*
*Attorney*

INVENTORS
Theo Stutz
BY
Michael S. Striker
Attorney

Inventors:
Theo Stutz

By
Michael S. Striker
Attorney

Inventors:
Theo Stutz

By
Michael S. Striker
Attorney

Inventors:
Theo Stutz

By:
Michael S. Striker
Attorney

ARRANGEMENT FOR COUNTING SIGNALS OF SPECIFIC SIGNIFICANCE

Filed Aug. 24, 1964

Inventors:
Theo Stutz

By:
Michael S. Striker
Attorney

ARRANGEMENT FOR COUNTING SIGNALS OF SPECIFIC SIGNIFICANCE

Filed Aug. 24, 1964

Theo Stutz
INVENTORS

Michael S. Striker
Attorney

Inventors:
Theo Stutz
By:
Michael S. Striker
Attorney

Inventor
Theo Stutz
by
Michael J. Strike

Inventor
Theo Stutz

Inventor
Theo Stutz
by Michael S. Striker

United States Patent Office 3,408,484

Patented Oct. 29, 1968

3,408,484

ARRANGEMENT FOR COUNTING SIGNALS OF SPECIFIC SIGNIFICANCE

Theo Stutz, Zurich, Switzerland, assignor to Contraves A.G., Zurich, Switzerland Continuation-in-part of application Ser. No. 279,039, May 6, 1963. This application Aug. 24, 1964, Ser. No. 392,998

Claims priority, application Switzerland, May 4, 1962, 5,370/62; Aug. 23, 1963, 10,417/63; Aug. 30, 1966, 12,559/66

11 Claims. (Cl. 235—92)

ABSTRACT OF THE DISCLOSURE

Logic network means for use with multiphase binary signal generator means which, for a continuous change of a physical quantity, are adapted to generate a primary combination signal consisting of a first predetermined cyclic sequence of possible signal combinations for a positive unit change of the quantity and a second sequence for a negative unit change of the aforesaid physical quantity. This logic network includes a plurality of input lines corresponding in number to the number of phases of the primary combination signal, a plurality of output lines corresponding in number to the number of the input lines, and a plurality of bistable switching means direct current coupled and logically interconnected both mutually and to the input lines and output lines, in such a manner that a secondary combination signal is generated, the secondary combination signal having the same number of phases and the identical sequence of binary signal combinations as the primary combination signal, but a secondary period which is an integral multiple of the primary combination signal period.

This is a continuation-in-part of my pending application Ser. No. 279,039, filed May 6, 1963 and entitled "Arrangement for Counting Signals of Specific Significance" and now abandoned.

The present invention concerns an apparatus for counting the occurrence of certain signal elements or characteristics, for instance for counting the number of changes from the condition "no" (O) to the condition "yes" (L) in the case of "yes-no" signals which may be produced by suitable signal generators for the purpose of obtaining digital results when monitoring occurring changes of variable quantities. In other words, the invention concerns an apparatus for forming the algebraic sum of digits each representing a unit value of increments occurring within a change in positive or negative direction of a variable quantity.

Signal generators are known which change a given signal from "no" condition to "yes" condition alternatingly whenever during the variation of a variable quantity a change in the form of an increment of a certain predetermined unit value occurs. Also counting arrangements are known by means of which such signal changes are continuously counted so that, provided that the counting is carried out in the same direction as the positive or negative direction of the particular change of the monitored quantity, it is possible for instance to read from the counting arrangement at any time the actual value or magnitude of the particular quantity. In order to provide for a high counting speed these known counting arrangements are in most cases electronic counters for counting the sequences of electrical signals. However, it has been found, that the great inconvenience exists that spurious signals which are practically unavoidable, may frequently imitate or be taken as a "yes" signal of the generator so that this spurious signal would be counted by the counting arrangement and thus produce the wrong result. This is the reason why arrangements of this type are not suitable for being used in the modern technique of measuring, controlling, regulating and computing on the basis of digital values.

It is therefore one object of the present invention to provide for a counting apparatus which is absolutely safe against such disturbances by spurious signals.

It is a further object of this invention to improve conventional counting apparatus by providing means for causing the positive or negative direction of the changes of the monitored quantity to be transmitted without any delay through all the counting stages of the counting apparatus. In this manner the maximum counting speed depending upon the construction of the counting arrangemet stages will not be reduced substantially by the necessity for waiting, whenever the direction of the change steps varies, for all the counting stages to be switched by means of an auxiliary signal to a different counting direction.

It is another object of this invention to further improve an apparatus of the type set forth by supplementing it with devices which overcome difficulties that otherwise would arise if coincidence should occur between two identical pairs of input signals.

Another object of the invention is to provide for a position control arrangement comprising the features of one or the other of the above contemplated apparatus.

It is still another object of the invention to provide for an arrangement of the type set forth capable of converting input values *x*, *y*, *z* into increment signals I*x*, I*y*, I*z*, respectively, and converting such input values into a sum $Ax+By+Cz$.

The invention utilizes certain conventional components or devices. For instance, multiphase signal generators are kown which deliver over a plurality of output lines sequences of signal element combinations representing a unit value change step or value increment occurring within a change of a variable quantity, the signal sequences characterizing the positive or negative direction of the respective change step. There are known e.g. two-phase signal generators which issue on two output lines electrical "yes-no" signals which, if the change of the quantity takes place in one direction, represent a single change step of unit value in the following manner:

First line: no-yes-yes-no, i.e. O-L-L-O etc.
Second line: no-no-yes-yes, i.e. O-O-L-L etc.

If the change of the monitored quantity takes place in opposite direction then the cycle of signal elements is reversed;

First line: no-no-yes-yes, i.e. O-O-L-L etc.
Second line: no-yes-yes-no, i.e. O-L-L-O etc.

It should be noted that signals furnished by signal generators as mentioned above do not have to be electrical signals under all circumstances. It is quite as well possible to utilize for the same purpose optical, hydraulic or pneumatic signal pulses.

It is therefore another object of this invention to provide for a counting apparatus which is capable to utilize and to process such signal sequences furnished by multiphase signal generators in a particularly advantageous manner namely so that the arrangement operates in a way most closely resembling the operation of a mechanical speed reduction gear arrangement in which the direction of turn of the driven input shaft is automatically transmitted without any additional control means to all the reduced speed gears of the respective gear train.

With above objects in view the invention includes an apparatus for forming the algebraic sum of digits each representing a unit value of increments occurring within a change in positive or negative direction of a variable quantity, comprising, in combination, at least one multiphase signal generator means having a plurality of outputs and producing when actuated for each unit value of an occurring increment a cyclically repeatable primary combination signal of predetermined cycle duration composed of a plurality of different sequences of signal elements appearing at said different outputs, respectively, said signal elements in said sequences thereof following each other in one sense when the respective increment takes place in positive direction, and in opposite sense when the particular increment takes place in negative direction; control means for actuating said signal generator means depending on the occurrence and direction of an increment of a variable quantity; and at least one logical circuit means having input means connected with said outputs of said signal generator means and having a plurality of outputs equal in number to that of said outputs of said signal generator means, said logical circuit means converting each of said primary combination signals into a secondary combination signal composed of the same sequences of signal elements as said primary combination signal, the cycle duration of said secondary combination signal being an integer multiple of that of said primary combination signal.

The invention further includes an apparatus for forming the algebraic sum of digits each representing a unit value of increments occurring within a change in positive or negative direction of a variable quantity, comprising, in combination, at least one multiphase signal generator means having a plurality of outputs and producing when actuated for each unit value of an occurring increment a cyclically repeatable primary combination signal of predetermined cycle duration composed of a plurality of different sequences of binary code signal elements appearing at said different outputs, respectively, said binary code signal elements in said sequences thereof following each other in one sense when the respective increment takes place in positive direction, and in opposite sense when the particular increment takes place in negative direction; control means for actuating said signal generator means depending on the occurrence and direction of an increment of a variable quantity; one logical circuit means constituting a first binary counting chain stage having input means connected with said outputs of said signal generator means and having a plurality of outputs equal in number to that of said outputs of said signal generator means, said logical circuit means converting each of said primary combination signals into a secondary combination signal composed of the same sequences of signal elements as said primary combination signal, the cycle duration of said secondary combination signal being twice that of said primary combination signal; and at least another logical circuit means constituting another binary counting chain stage having input means connected with said outputs of said first binary counting chain stage and having outputs equal in number to that of said outputs of said signal generator means, said second binary counting chain stage converting said secondary combination signal into a tertiary combination signal composed of the same sequences of signal elements as said secondary combination signal, the cycle duration of said teritary combination signal being twice that of said secondary combination signal.

In order to avoid the necessity of providing for special wave shapes of alternating voltage signals, it is advisable to base the construction of the arrangement according to the invention on the use of direct current by coupling e.g. certain bistable switching elements required therein by direct current connections, which means that between various counting chain stages no coupling means are provided which as for instance capacitors or transformers only transmit occurring changes in the condition of one circuit component to the other, but the actual condition of one of these components is directly transmitted by direct current connection to the other component. Incidentally, also in the case of hydraulic or pneumatic counting devices a coupling of this type can be arranged for.

For better understanding the basic concept of this invention it should be borne in mind that the signal generator mentioned above and further down in the specification and claims actually acts as an increment signal generator furnishing signals each of which represents an increment (positive or negative) of predetermined magnitude of a variable quantity as the latter varies. In the case of signal generators of the type referred to above a preselected small increment unit I is composed of four smaller fractional increments of the magnitude $I/4$ which may follow one another in positive as well as in negative direction. Each increment unit I is represented by a full cycle of four signal elements, each element being a pair of signals appearing in the two output lines of the two-phase generator. For instance, a positive fractional increment may be represented by a change of condition from L, O to L, L or from L, L to O, L, and a negative fractional increment may be represented by a change of condition from L, O to O, O or from L, L to L, O.

Similarly the counting apaparatus referred to above would function as an increment adder so that as a result of such addition for instance a mechanism may be controlled so as to undergo changes of position exactly corresponding to the variation of said variable quantity the positive and negative increments whereof are represented by said signals. Similarly, by integration of such increments i.e. corresponding processing of the respective signals an indication of the value of said variable quantity at any given moment or the position at any given moment of a moving element changing position depending upon or in line with said chage of said variable quantity can be obtained.

It will be seen that a counting apparatus according to the invention does not count exclusively the individual switching operations by which changes between "yes" and "no" condition is produced at the input lines. Instead the apparatus according to the invention counts combination signals composed of sequences or cycles of different conditions or signal elements appearing at the different input lines. Hereby the great advantage is achieved that spurious signals which otherwise might imitate the switch from a "yes" condition to a "no" condition or vice versa applying to one of the input lines, cannot be counted. In this manner the above mentioned object of the invention, namely avoiding the effects of spurious signals, is reached.

In order to solve the existing problem, for two-phase input signals the following system of equations in terms of Boolean algebra can be written:

$$\overline{R}=\overline{B}(AT+\overline{A}U)+S$$
$$\overline{S}=\overline{B}(AU+\overline{A}T)+R$$
$$\overline{T}=B(AR+\overline{A}S)+U$$
$$\overline{U}=B(AS+\overline{A}R)+T$$

In above equations the symbols R, S, T, U represent for instance output transistors which may be at a given moment either conductive or non-conductive, i.e. are either in condition L or in condition O, depending upon whether the respectively associated input pairs, A, B are at that moment in the condition L or condition O.

In the above system of equations the input lines, or rather the conditions in which they may be are represented by by $A_e$ or $\overline{A}_e$, and $B_e$ or $\overline{B}_e$, respectively, and if one avails oneself of the possibility that the output transistors act in pairs as flip-flop elements with outputs $A_a$ or $A_a$, and $B_a$ or $B_a$, respectively, then one obtains the following simultaneously valid simplified pairs of equations:

$$A_a=\overline{B}_e(A_e\overline{B}_a+\overline{A}_eB_a)+A_a$$
$$\overline{A}_a=\overline{B}_e(A_eB_a+\overline{A}_e\overline{B}_a)+\overline{A}_a$$
$$B_a=B_e(\overline{A}_eA_a+A_e\overline{A}_a)+B_a$$
$$\overline{B}_a=B_e(\overline{A}_e\overline{A}_a+A_eA_a)+\overline{B}_a$$

For defining the logical connections between the partial stages of the individual counting chain stages this simplified system of equations will be used further below in this specification and in the claims.

It is known to those skilled in the art that logical circuit conditions of this type can be embodied by parallel arrangements of series-connected relay contacts or by corresopnding combinations of "AND" and "OR" gate circuits arranged at the input of electronic, hydraulic or pneumatic "flip-flop" devices.

In accordance with the invention, a counting chain composed only of binary counting stages may be converted with the aid of comparatively simple additional means into an apparatus for counting decimal digits in their respective decimal order positions. Assuming that the decimal digits are represented each by a binary code term composed of four binary elements, it is only necessary to supplement each group of four consecutive binary counting chain stages constituting a tetrade assigned to deal with a particular decimal order of decimal numbers, by adding an auxiliary control or change-over switching stage which serves to select out of the sixteen possible element combinations of the four binary counting stages only ten and employs these ten combinations in such a manner that a suitable binary code for the decimal digits 0 to 9 is established.

For instance, in the case of a two-phase binary counting chain composed of tetrades (as explained above) in each tetrade between the first and second binary counting stage an auxiliary control stage constituting a two-phase switching device may be inserted which operates in the following manner. It responds to the input signals $A_e$ and $B_e$ applied to the particular tetrade, to the output signals $A_1$ and $B_1$ of the first binary counting stage, and to one of the output signals $B_3$ and $B_4$ of the third or fourth binary counting stage of that tetrade, and applies to the second binary counting stage during each sequence of ten complete combination signals $A_e$ and $B_e$ first two cycles of the output signal combination $A_1$ and $B_1$ of the first binary counting stage, thereafter six cycles of the input signal combinations $A_e$ and $B_e$, and finally again two cycles of the output combination signals $A_1$ and $B_1$ of the first binary counting stage. For obtaining this result it is sufficient if the two-phase switching device or auxiliary control stage satisfies, as far as the signal combinations $A_1^*$ and $B_1^*$ applied to the second binary counting stage are concerned the following conditions defined in terms of Boolean algebra:

$$A_1^*=\overline{B}_3\overline{B}_4A_1+A_0(B_3+B_4)$$
$$B_1^*=\overline{B}_3\overline{B}_4B_1+B_0(B_3+B_4)$$

In this manner one arrives at a very convenient and advantageous binary code for decimal digits wherein the combination of the operative ("yes" or "no") conditions of the bistable circuit elements $A_1$, $A_2$, $A_3$ and $A_4$, respectively, associated with A-phase of the signals and provided in the four counting stages of each tetrade correspond to the ten decimal digits 0 to 9, as follows:

| | Weight | | | |
|---|---|---|---|---|
| | 4 | 2 | 2 | 1 |
| | Circuit Element | | | |
| | $A_4$ | $A_3$ | $A_2$ | $A_1$ |
| Decimal Digit: | | | | |
| 0 | O | O | O | O |
| 1 | O | O | O | L |
| 2 | O | O | L | O |
| 3 | O | L | O | L |
| 4 | O | L | L | O |
| 5 | L | O | O | L |
| 6 | L | O | L | O |
| 7 | L | L | O | L |
| 8 | L | L | L | O |
| 9 | L | L | L | L |

It can be seen that this binary code meets all the conditions that have been set up to now for codes of this type representing decimal digits:

(1) The binary numbers increase stepwise monotonously, i.e. the value of the binary numbers considering the weight given to the individual bits increases by units.

(2) If in any one of the binary representations of a decimal digit each L is converted into an O, and each O is converted into an L, the resulting binary number represents the nines-complement of the respective decimal digit.

(3) In view of the convenient weight allocation to the individual binary order positions the code is easily readable and its indications can be converted correspondingly easily into analog values.

(4) The binary digit in the first order position from the right indicates clearly whether the represented decimal digit is an odd or an even number because O corresponds to even numbers and L corresponds to odd numbers.

(5) The binary digit in the first order position from the left indicates clearly whether the represented decimal digit is smaller than 5 as indicated by O, or larger than 4 as indicated by L.

(6) The coded terms may be considered as four-element binary numbers and may be added as such. If this is done in an adding device a correction only in one order position will be required when the output of the adding device is applied to a digital-analog-converter.

In certain cases it may be desirable to count in a counting apparatus according to the invention the algebraic sums of two signal sequences furnished by two signal generators, e.g. in order to continuously form the variable difference between a program value of a certain physical quantity to be controlled, on one hand, and a variable actual value of that quantity as furnished by the second signal generator, on the other hand, so that said algebraic sum or a corresponding signal may be used for controlling or adjusting the particular physical quantity after the difference value found by the operation of the apparatus has been converted into an analog control or adjustment value. This can be achieved in accordance with the invention if a multiphase adding device is used which in its function resembles that of a mechanical differential gear. Accordingly it is for instance possible to connect the output lines X and Y of a two-phase adding arrangement (which has its inputs connected to the pairs of outputs A, B and C, D, respectively, of two-phase signal generators) with the two inputs of a two-phase counting apparatus according to the present invention. All that is necessary is that for instance the two-phase adding arrangement must comply with the following conditions in terms of Boolean algebra:

$$X=A\overline{C}\overline{D}+\overline{A}CD+B\overline{C}D+\overline{B}C\overline{D}$$
$$Y=AB\overline{D}+A\overline{B}C+\overline{A}\overline{B}D+\overline{A}B\overline{C}$$

Generally, it should be understood that wherever in this specification the term "counting stage" is used it is not intended to have included means for indicating the result of a count, because such "counting stages" may as well be considered as being "binary storage arrangements" for storing certain values in binary form because it is well known that such stored information may be transmitted or applied to other devices by conventional means.

It will be understood that in a system as contemplated pairs of signals A, B and C, D may be delivered by two signal generators simultaneously and such coincidence, particularly if the pairs are identical, would create a serious difficulty since the counter or adder would not "know" in which direction to move. It will be shown that by deriving somewhat delayed signals $A_v$, $B_v$, $C_v$, $D_v$ from A, B, C, D, respectively, and by processing pairs A, $A_v$; B, $B_v$; C, $C_v$; D, $D_v$ a proper functioning of the system can be achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic circuit diagram illustrating a basic embodiment of the invention including one example of a two-phase electrical signal generator and of a two-phase binary counting stage;

FIG. 1*a* is a diagrammatic illustration of a modification of the arrangement according to FIG. 1 and including a plurality of counting stages in series-connection;

Figure 7A:
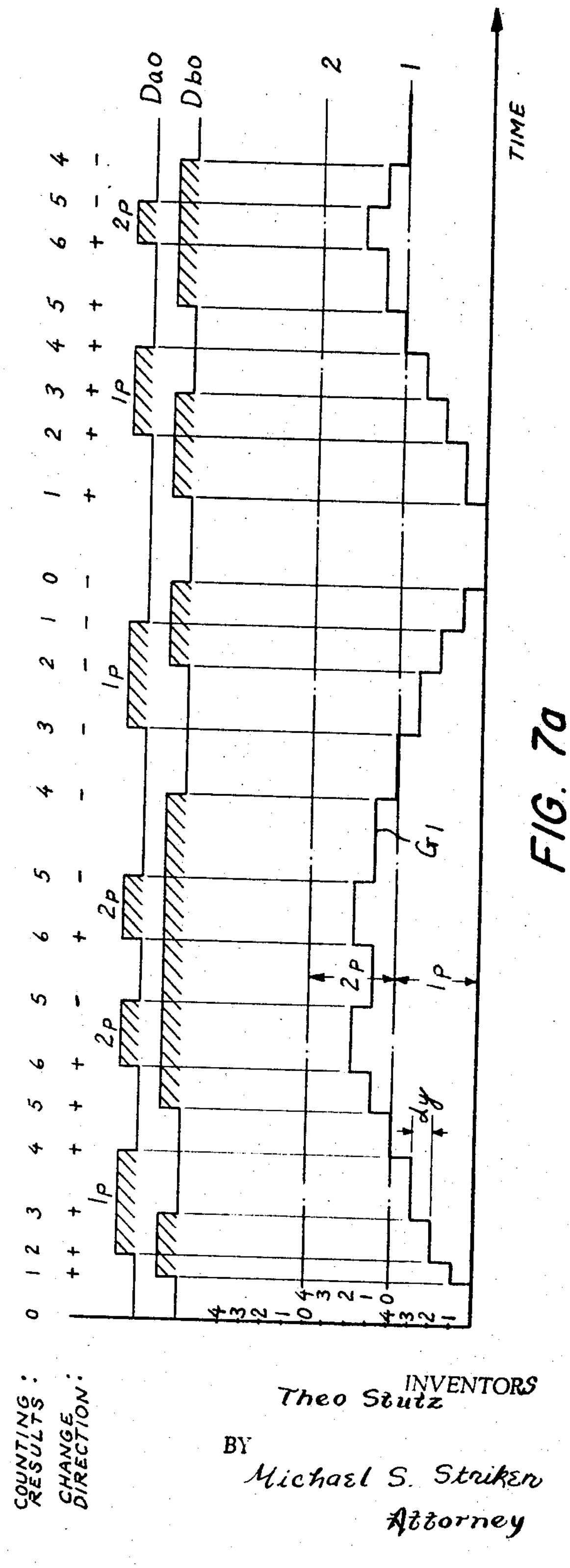
FIG. 7 is a schematic circuit diagram illustrating a combination of two signal generators furnishing two-phase signals to a two-phase adding arrangement which, in turn, issues such signals representing the sum of the first mentioned two-phase signals to an adding arrangement e.g. according to FIG. 5.
Figure 5:
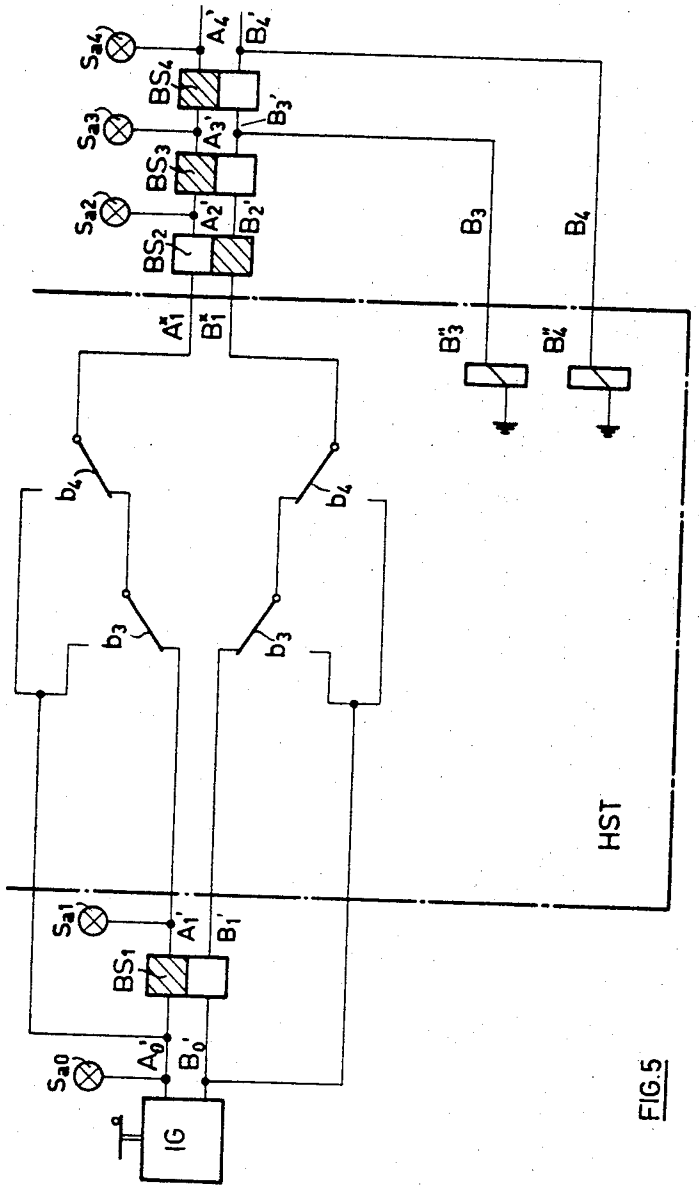
FIG. 5 is a schematic circuit diagram illustrating a further development of the invention in the form of a binary counting chain comprising a tetrade of series-connected counting stages and an auxiliary control stage.
Figures 7, 8:
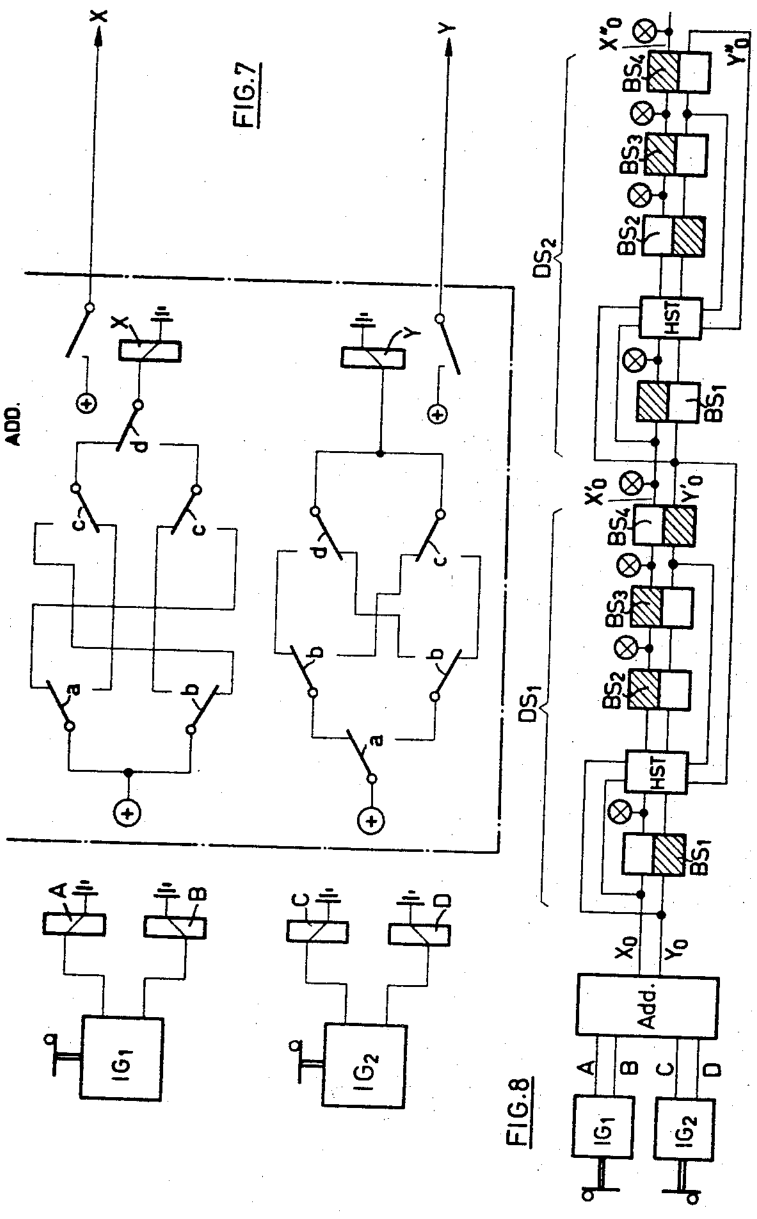
Figure 7B:
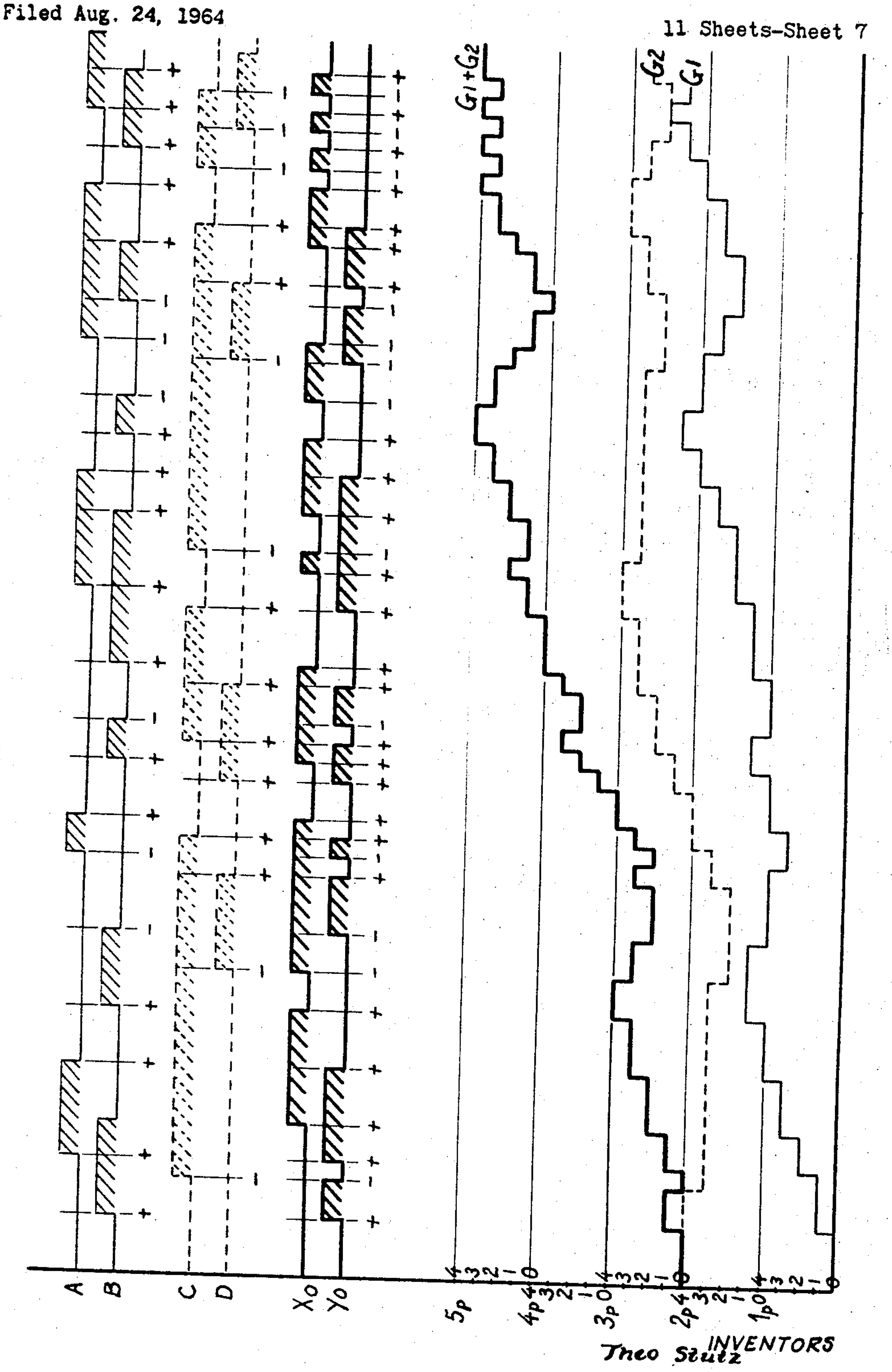
Figure 9:
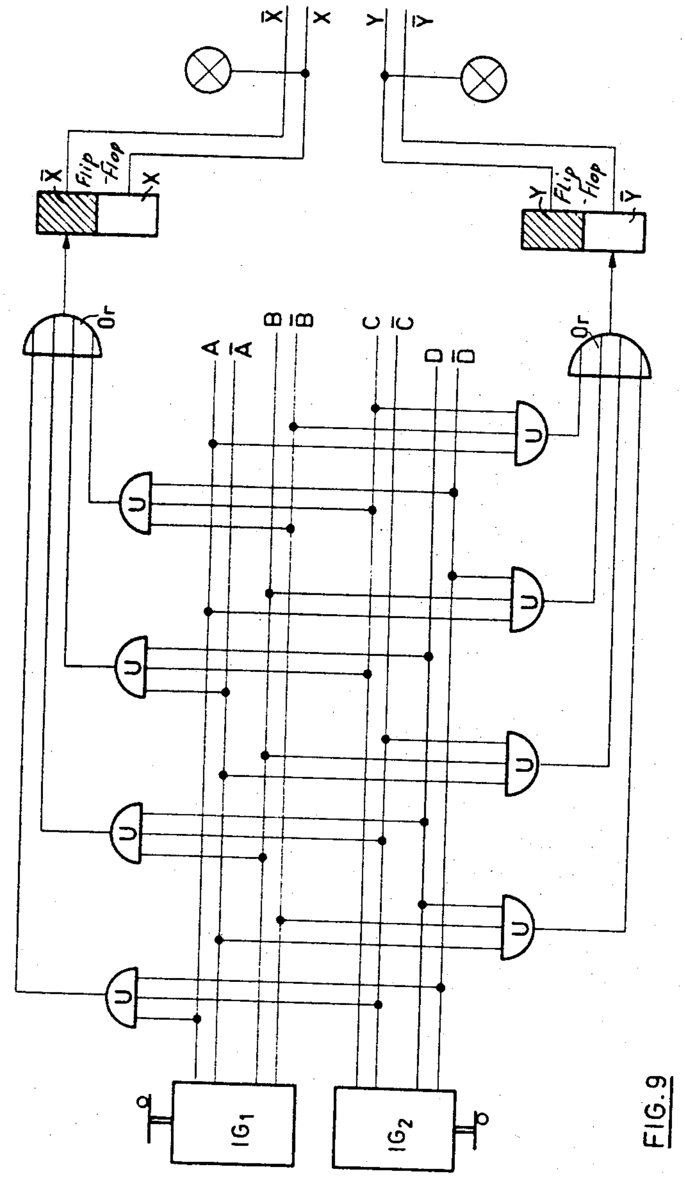
Figure 10:
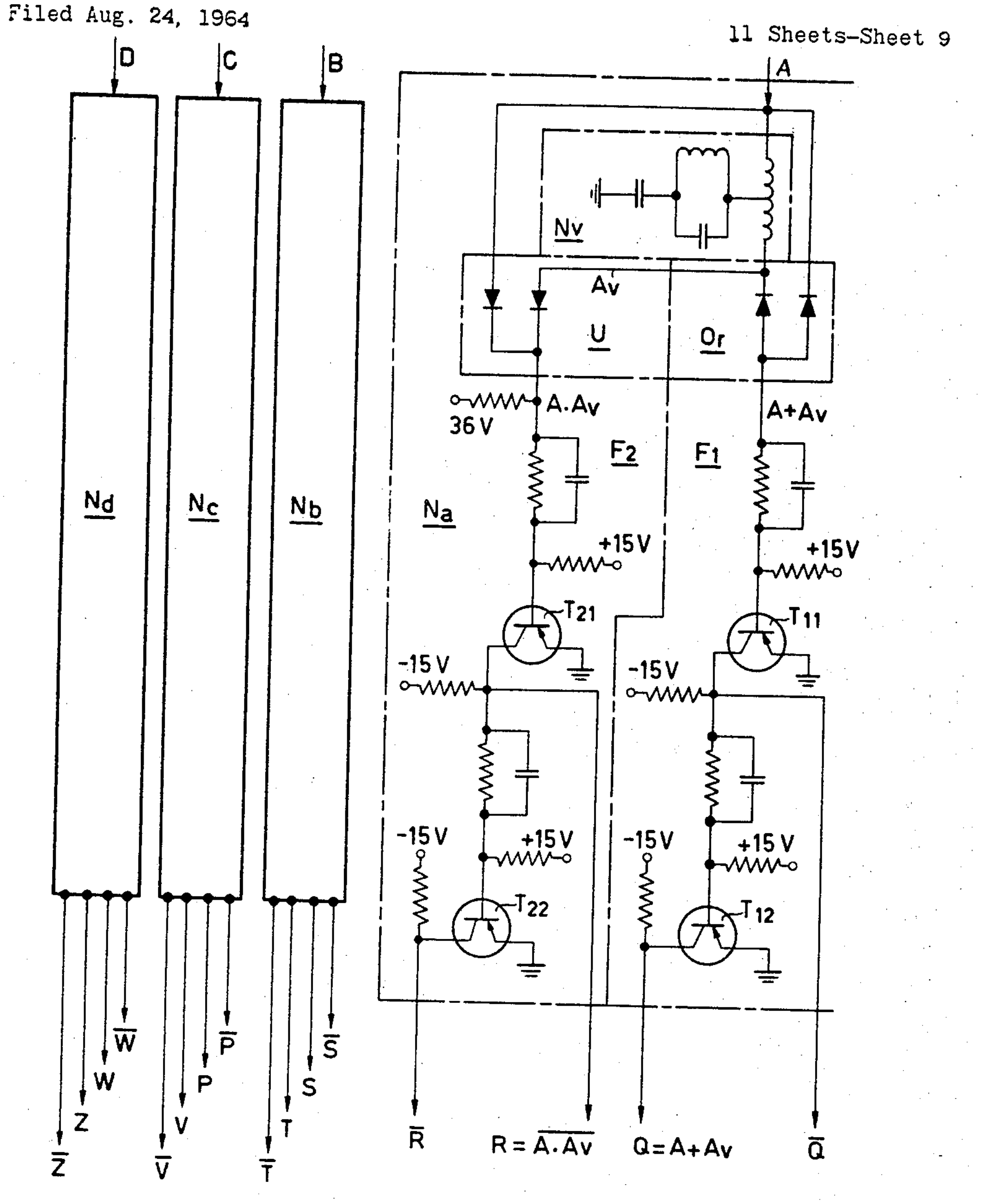
Figure 11:
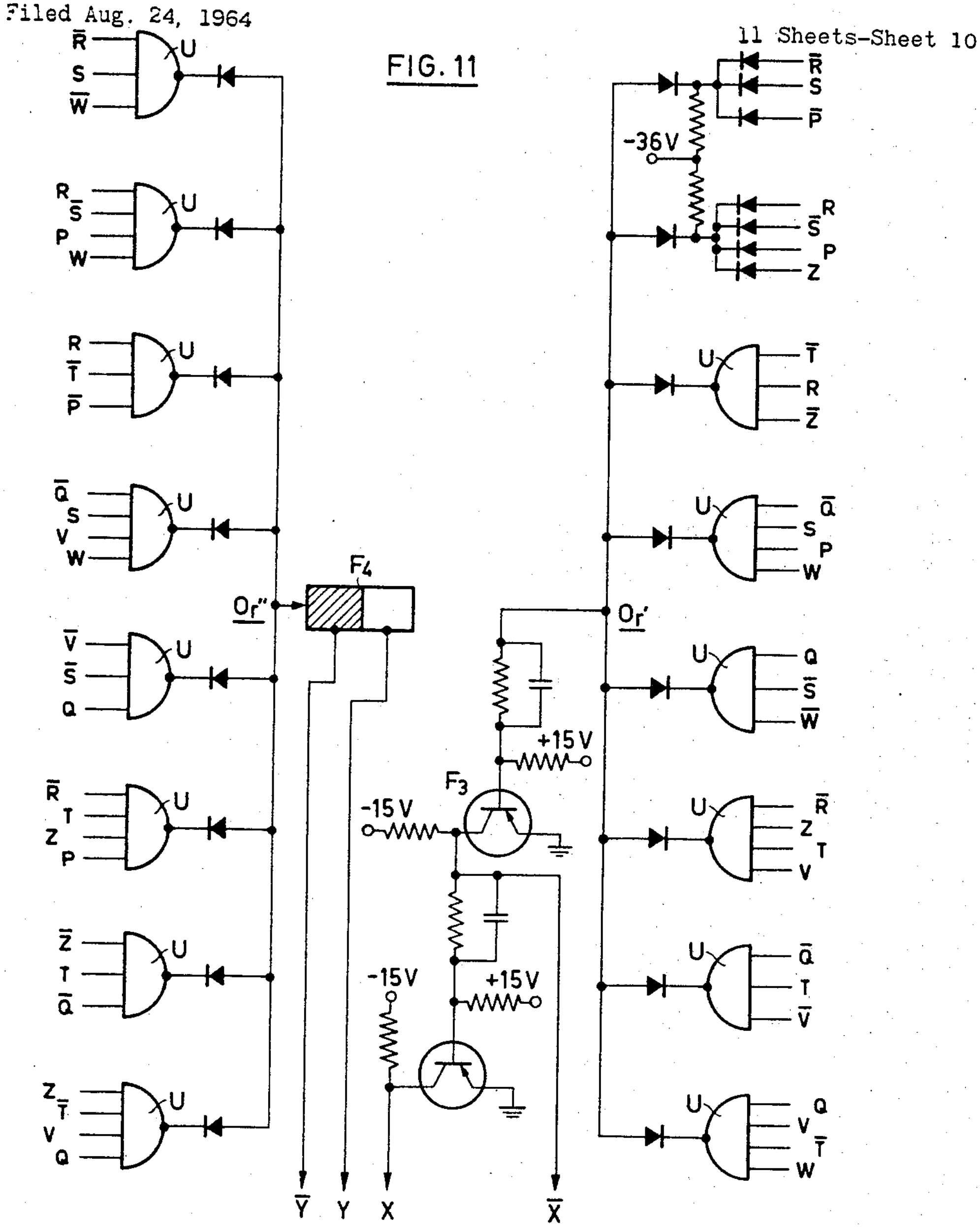
Figure 12:
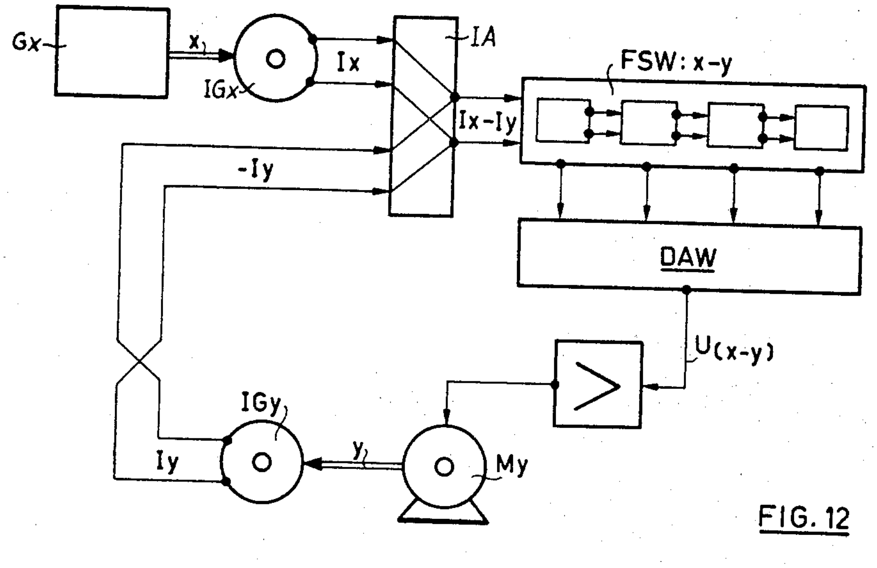
Figure 13:
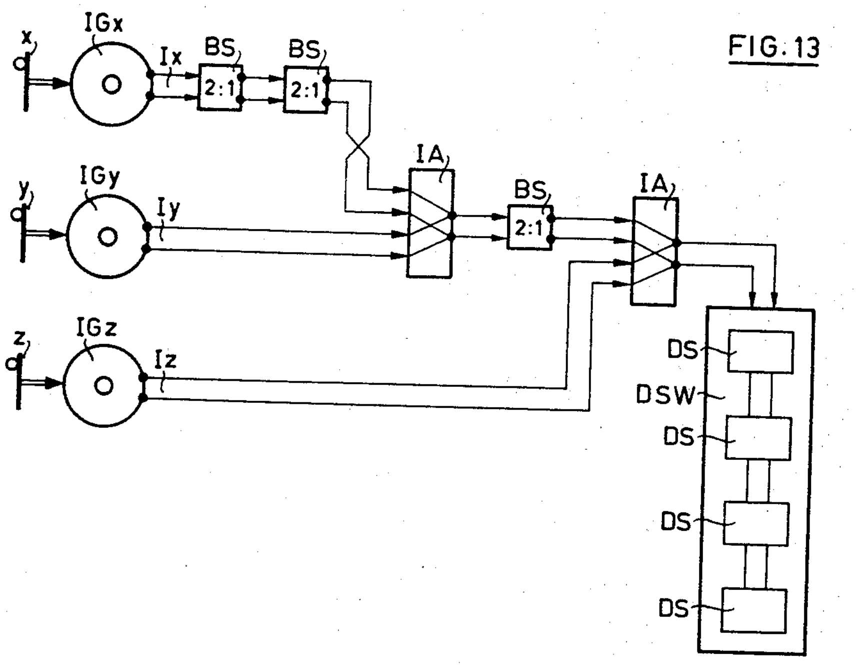

FIGS. 7*a* and 7*b* are time diagrams illustrating the sequence and combination of signals as they may be processed by arrangements according to FIGS. 5 and 7, respectively;

FIG. 8 is another diagram illustrating the cooperation of an arrangement according to FIG. 7 with two binary adding chains including each a tetrade of adding stages;

FIG. 9 is another schematic circuit diagram illustrating an electronic adding arrangement suitable to replace the adding arrangement of FIG. 7;

FIG. 10 is a schematic circuit diagram of a first portion of an electronic adding arrangement according to the invention, modified for being insensitive to coincidences of two identical pairs of input signals;

FIG. 11 is a similar diagram illustrating a second portion of said arrangement;

FIG. 12 is a schematic diagram of a servomotor arrangement for position control according to the invention; and FIG. 13 is a diagram of an arrangement according to the invention for producing a value of the form $$A_x+B_y+C_z$$

derived from independently variable input values *x*, *y* and *z*.

Figures 1, 2, 3:
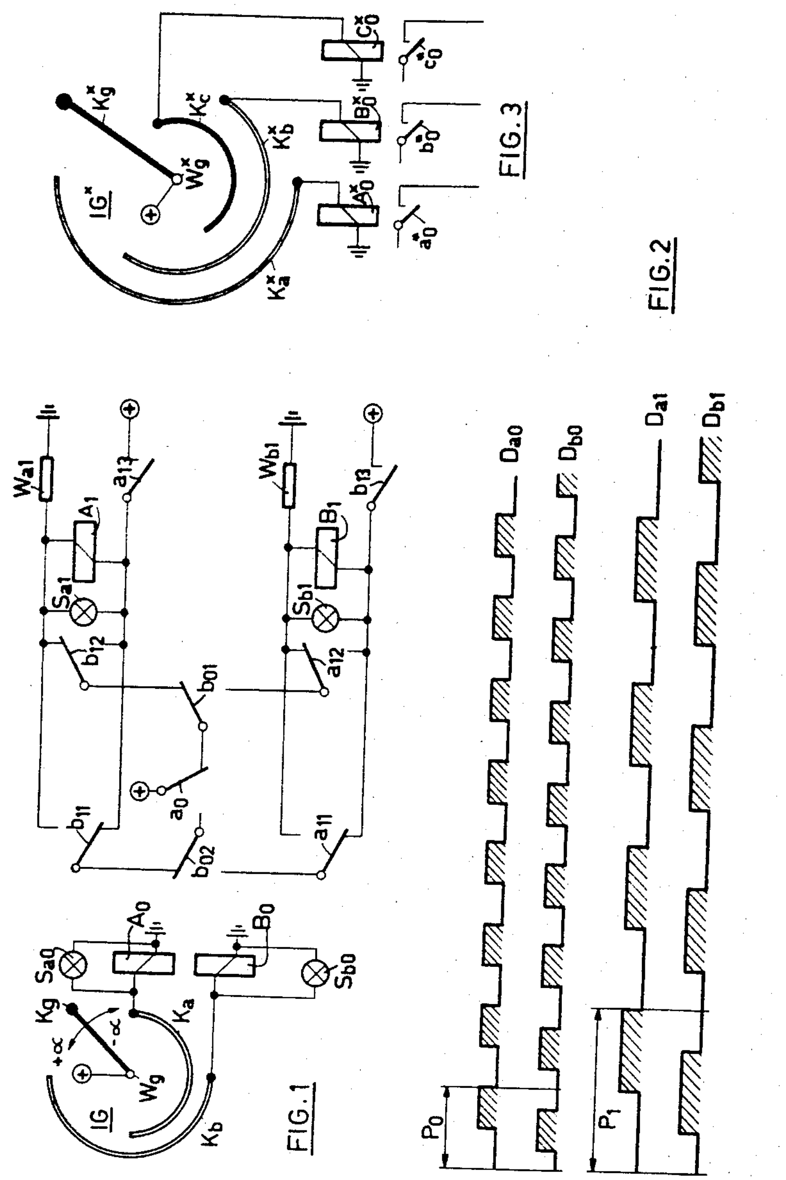
FIG. 2 is a time diagram illustrating the relation between input signals applied to the counting stage of FIG. 1 and output signals furnished thereby.
FIG. 3 is a schematic diagram of a three-phase electrical signal generator otherwise similar to that which is shown in FIG. 1.

Referring now to FIG. 1, by way of example one type of a two-phase electrical signal generator IG is illustrated which includes a wiper contact arm $K_g$ carried by a shaft $W_g$ for rotation both in counter-clockwise direction $+\alpha$ or in clockwise direction $-\alpha$ as may be desired. It is to be assumed that the shaft $W_g$ is rotated by means not shown in accordance with positive or negative changes of some variable quantity to be monitored. A complete rotation of the wiper arm $K_g$ would correspond to the unit value of a change step. The arm $K_g$ is connected to the positive terminal of a source of direct current as indicated. During rotation the wiper arm $K_g$ cooperates with two semi-circular stationary contact bars $K_a$ and $K_b$ which are 90° offset against each other as shown. The contact bars $K_a$ and $K_b$ are connected to ground via respectively associated relay coils $A_0$ and $B_0$. It will be understood readily that the two relay coils will be alternatingly energized and de-energized while the wiper arm $K_g$ rotates in counter-clockwise direction which corresponds to positive changes of the variable quantity to be monitored. The periodic energizations and de-energizations of the relay coils $A_0$ and $B_0$, respectively, are illustrated graphically by the diagrams $D_{a0}$ and $D_{b0}$, respectively, of FIG. 2. One complete rotation of the wiper arm $K_g$ constitutes a period $P_0$ as shown in FIG. 2. In view of the construction of the contact bars $K_a$ and $K_b$ the diagrams $D_{a0}$ and $D_{b0}$ are identical with each other, however the second one $D_{b0}$ leads the other in phase, the phase difference being ¼ of a period $P_0$.

Thus it can be seen that if the directional angle $\alpha$ of the slider arm $K_g$ changes in positive direction i.e. by counter-clockwise rotation the two-phase signal generator IG will cause energization of its output relay coils $A_0$ and $B_0$, respectively, consecutively in such a manner that, considering the relay coils $A_0$ and $B_0$ as outputs of the generator, during each cycle of the generator a combination signal appears at these outputs, the combination signal being composed of two sequences of signal elements as indicated by:

OO—OL—LL—LO wherein O represents de-energization and L represents energization of a relay coil, each pair of these symbols representing the simultaneous condition of the two relay coils $A_0$ and $B_0$. Each such signal sequence constituting one combination signal corresponds to one complete turn of the shaft $W_g$.

It will not require detailed explanation for understanding that in the case of a rotation of the shaft and wiper arm $K_g$ in the opposite i.e. negative direction the resulting combination signal would be

OO—LO—LL—OL

It can be seen readily that the two combination signals differ from each other and that thus these combination signals directly indicate by their own nature whether they are produced by a positive or by a negative change of the variable quantity being monitored.

It should be noted that other signal generators may be used. For instance optical-electrical two-phase signal generators for indicating angular variations are known which produce such cyclic combination signals representing very small angular steps of a rotary member and which could be used for monitoring or measuring rotary movements in a manner similar to that described above with respect to the rotary signal generator IG.

It is well known that a two-phase system can be converted into a three-phase system and vice versa. As an example FIG. 3 illustrates a three-phase generator IG* which is constructed and operates in a manner quite similar to that of the generator of FIG. 1, but which comprises three circular contact bars $K_a$*, $K_b$* and $K_c$*, each extending over an arc of 180° and being offset angularly 60° against each other, with a wiper arm $K_g$* cooperating therewith and carried by a shaft $W_g$*. During one complete turn of the arm $K_g$* the three relay coils $A_0$*, $B_0$* and $C_0$*, respectively, are energized alternatingly. Of course, if not a three-phase adding arrangement is supplied by the output of this signal generator, the output signals from the three-phase arrangement of FIG. 3 could be converted by conventional means into two-phase signals which then could be processed in the manner described in reference to FIG. 1.

Returning now to FIG. 1, the two-phase binary counting stage illustrated thereby will now be described. This binary counting stage serves to form the algebraic sum of positive and negative, as the case may be, signal sequences $A_0$ and $B_0$ produced by the signal generator IG by means of energizations of the relay coils $A_0$ and $B_0$. The counting stage comprises two output relay coils $A_1$ and $B_1$ constituting electrically controllable bistable circuit components. The relay coils $A_1$ and $B_1$ are connected between a positive terminal of the above mentioned direct current source and ground by a network which comprises contacts $a_0$, $b_{01}$ and $b_{02}$ operated by the generator relay coils $A_0$ and $B_0$, respectively, and contacts $a_{11}$, $a_{12}$, $a_{13}$, $b_{11}$, $b_{12}$ and $b_{13}$ actuated by the relay coils $A_1$ and $B_1$, respectively. It can be seen readily and it will be explained further below that on account of the circuit details of FIG. 1 the two relay coils $A_1$ and $B_1$ will be energized in a manner illustrated by the diagrams $D_{a1}$ and $D_{b1}$, respectively, of FIG. 2, provided that the relay coils $A_0$ and $B_0$ of the signal generator are operated in accordance with the diagrams $D_{a0}$ and $D_{b0}$, respectively. Thus, the two output relay coils $A_1$ and $B_1$ are actuated in a two-phase combination signal cycle which corresponds exactly to that of the signal generator relay coils $A_0$ and $B_0$, respectively, as far as the signal sequence within each cycle is concerned, while the period duration $P_1$ of the output combination signal is twice as long as that of the period duration $P_0$ of the input combination signal. This amounts to a step-down ratio of 2:1 between the respective counting speeds.

The energization of the relay coils $A_1$ and $B_1$ i.e. the output signal production of the counting stage, in response to the actuation of the signal generator relay coils $A_0$ and $B_0$, respectively, is illustrated by the following chart:

| Energization of Relay Coils | | | | Rotation of Kg Positive (counterclockwise |
|---|---|---|---|---|
| $A_0$ | $B_0$ | $A_1$ | $B_1$ | |
| First turn: | | | | |
| O | O | O | O | Starting condition as shown in Fig. 1. |
| O | L | O | O | Kg on $K_b$: $B_0$ energized, $b_{01}$ and $b_{02}$ without effect. |
| L | L | O | L | Kg on $K_a$ and $K_b$:$A_0$ and $B_0$ energized, $B_1$ energized via $a_0$, $b_{02}$, $a_{11}$ and $W_{b1}$. |
| L | O | O | L | Kg on $K_a$:$B_1$ holds itself via $b_{13}$. |
| Second turn: | | | | |
| *O | O | L | L | Kg off: $A_1$ energized via $A_0$, $b_{01}$, $b_{12}$ and $W_{a1}$. |
| ** O | L | L | L | $A_1$ holds itself via $a_{13}$ and $W_{a1}$. |
| L | L | L | O | $B_1$ is shunted via $a_0$, $b_{02}$, $a_{11}$ and $W_{b1}$. |
| L | O | L | O | |
| Third turn: | | | | |
| O | O | O | O | $A_1$ is shunted via $a_0$, $b_{01}$, $b_{12}$, and $W_{a1}$. |
| | | | | Rotation of Kg Negative (Clockwise) |
| First turn: | | | | |
| O | O | O | O | Starting condition per Fig. 1. |
| L | O | L | O | $A_1$ energized via $a_0$, $b_{02}$, $b_{11}$, and $W_{a1}$. |
| L | L | L | O | $A_1$ holds itself via $a_{13}$ and $W_{a1}$. |
| ***O | L | L | L | $B_1$ energized via $a_0$, $b_{01}$, $a_{12}$ and $W_{b1}$. |
| Second turn: | | | | |
| O | O | L | L | $B_1$ holds itself via $b_{13}$ and $W_{b1}$. |
| L | O | O | L | $A_1$ shunted via $a_0$, $b_{02}$, $b_{11}$, and $W_{a1}$. |
| L | L | O | L | |
| O | L | O | O | $B_1$ shunted via $a_0$, $b_{01}$, $a_{12}$ and $W_{b1}$. |
| Third turn: | | | | |
| O | O | O | O | |

It can be seen from the above that spurious signals which may simulate an energization of the relay coils $A_0$ or $B_0$ or which might prevent the indication of an energization of one of these two relays, may be capable of erroneously changing the operative condition of the output relay coils $A_1$ or $B_1$, but as soon as the spurious signal vanishes the respective relay coil $A_1$ or $B_1$ returns to its previous condition.

For instance, if during operation at the moment marked * at the beginning of the second turn a wrong A-impulse should be received i.e. the relay coil $A_0$ is de-energized too late, then in the whole circuit arrangement the condition existing in accordance with the preceding line of the chart would continue until finally the erroneous or wrong signal impulse vanishes. Then immediately the normal operation would take effect. If, on the other hand, an erroneous or spurious A-impulse should appear at the moment marked by  then the relay coil $B_1$ would be shunted too early as indicated in the next following line i.e. this intended condition would be reached too early, but as soon as the erroneous A-impulse or signal has vanished, the normal course of operation would take place again. A similar condition would develop under similar circumstances at the moment marked *. It will be understood that in view of this behavior the two-phase binary counting arrangement as illustrated and described displays a very substantial insensitivity to disturbances by spurious signals.

It can be seen further that in a two-phase binary counting stage as described above not the occurrence of a single impulse but the occurrence of a complete cycle of four partial steps or a combination signal composed of a sequence of four signals are counted, and that the positive or negative direction of the changes to be counted and represented by the particular signal sequences in the combination signals is automatically and immediately also transmitted to the outputs of the binary counting stages, however all this with a reduction of the speed of signal sequence or increase of the cycle duration at the ratio of 1:2, i.e. in a manner comparable to a mechanical step-down gear transmission.

If now the binary counting stage illustrated by FIG. 1 is supplemented by at least one more similar binary counting stage having output relay coils $A_2$ and $B_2$, and if said second binary counting stage contains relay contacts actuated by the relay coils $A_1$ and $B_1$ in the same manner as in the first stage the contacts actuated by the relay coils $A_0$ and $B_0$ are operated, then a two-phase binary counting chain of a plurality of counting stages is established of which each stage cooperates with the next following stage in the same manner as the primary signal generator IG cooperates with the first binary counting stage illustrated in FIG. 1.

Various ways are open for deriving from the information stored during operations in the binary counting stages also an indication of the count performed. One simple expedient would be for example to connect, as illustrated in FIG. 1, signal lamps $S_{a0}$, $S_{b0}$ in parallel with the relay coils A and B, respectively, and similarly signal lamps $S_{a1}$ and $S_{b1}$ in parallel with the relay coils $A_1$ and $B_1$, respectively. These lamps would always indicate whether the respectively associated relay coil is energized or not which would mean whether a signal is momentarily stored in the arrangement by such energization of a coil. As mentioned above, energization of one of these relay coils represents the condition L and deenergization of such coil represents the condition O.

Figure 1A:
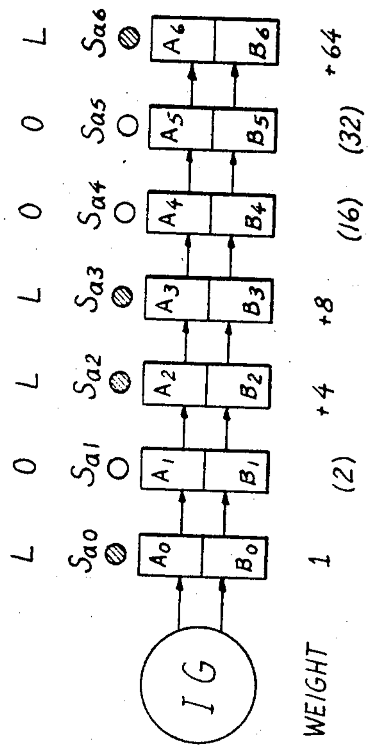

To elaborate on this idea FIG. 1*a* illustrates diagrammatically a signal generator IG in connection with a two-phase counting chain comprising six stages after the first stage represented by the relay coils $A_0$ and $B_0$. Next to each of these stages a signal light is shown and designated $S_{a0}$–$S_{a6}$. By way of example, some of the circles representing the signal lamps are shown cross-hatched which means that these lights are "on" which would represent that the respectively associated relay coil $A_0$, $A_2$, $A_3$ and $A_6$ is energized. The respectively corresponding L and O conditions are marked above each one of the signal lamps and stages. Below the arrangement is marked the weight which may be assigned to the symbol L in the various stages or in the sequence of their appearance in the consecutive positions. In this particular case the information stored in the arrangement would be represented by the binary number LOLLOOL which would correspond, in accordance with the indicated weights, to the decimal number 77.

The binary two-phase counting stage of FIG. 1 constitutes, on account of the relay coils $A_0$ and $B_0$ coupled by direct current connections with the relay coils A and B, respectively, and the respective contacts on arrangement having two inputs $A_0$ and $B_0$ and two outputs $A_1$ and $B_1$ which in accordance with Boolean algebra satisfies the following conditions:

$$A_1=\bar{A}_0\bar{B}_0B_1+A_0\bar{B}_0\bar{B}_1+A_1=\bar{B}_0(\bar{A}_0B_1+A_0\bar{B}_1)+A_1$$
$$\bar{A}_1=\bar{A}_0\bar{B}_0B_1+A_0\bar{B}_0B_1+\bar{A}_1=\bar{B}_0(\bar{A}_0\bar{B}_1+A_0B_1)+\bar{A}_1$$

$$B_1=\bar{A}_0B_0A_1+A_0B_0\bar{A}_1+B_1=B_0(\bar{A}^0A_1+A_0\bar{A}_1)+B_1$$
$$\bar{B}_1=\bar{A}_0B_0\bar{A}_1+A_0B_0A_1+\bar{B}_1=B_0(\bar{A}_0\bar{A}_1+A_0A_1)+\bar{B}_1$$

In consideration of the arrangement according to FIG. 1, in the above given system of Equations $A_0$ and $B_0$ represent the actual operative condition at a given moment of the relay coils forming part of the impulse generator IG, $A_1$ and $B_1$ represent the actual operative conditions at the same moment of the relay coils forming part of the first binary counting stage. On the other hand $\bar{A}_0$ and $\bar{B}_0$ as well as $\bar{A}_1$ and $\bar{B}_1$ represent the opposite operative conditions of the respective relays which do not exist at such given moment mentioned above.

While the above remarks concern an impulse generator including relay coils $A_0$ and $B_0$ it will be understood that it is known to those skilled in the art to construct two-phase impulse generators and to arrange such a generator for cooperation with a binary counting stage on the basis of the circuit logic applied to FIG. 1, without the use of relays.

Figure 4:
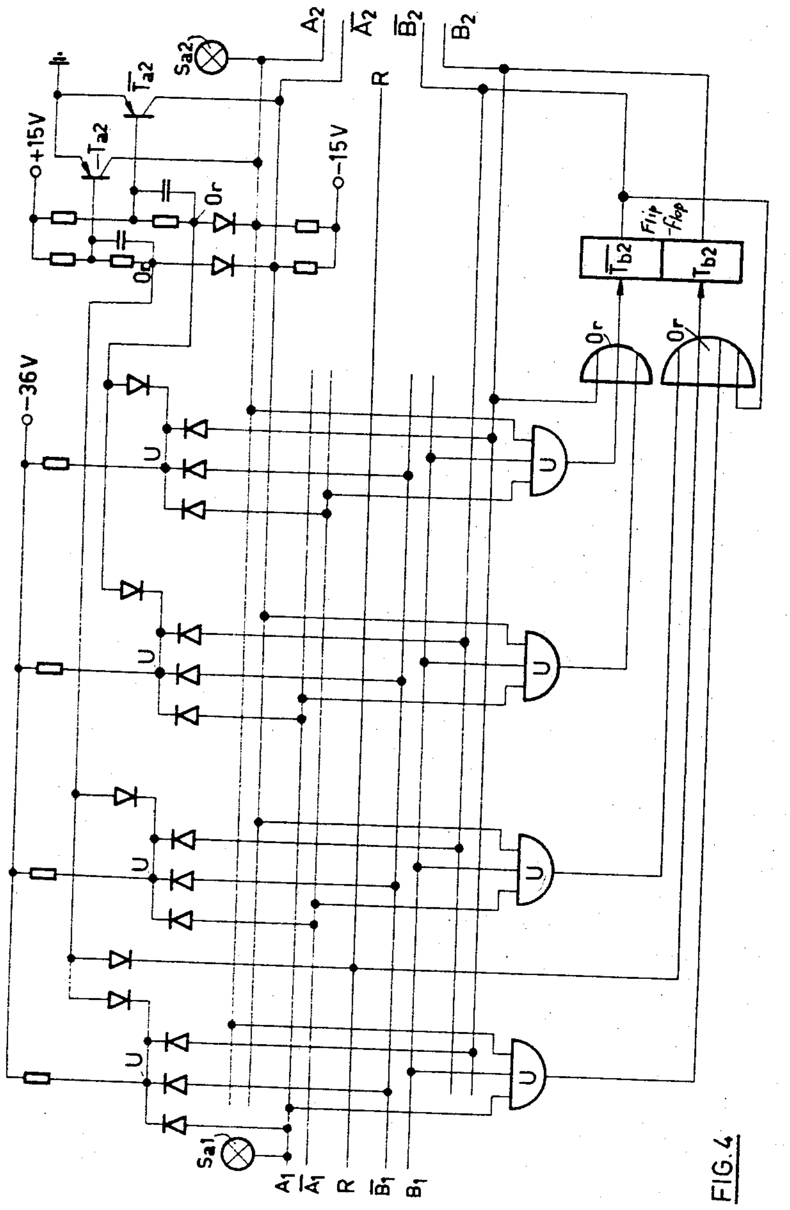
FIG. 4 is a schematic circuit diagram of a two-phase binary counting stage comprising a bistable flip-flop circuits instead of the bistable relays provided in the arrangement according to FIG. 1.

FIG. 4 illustrates a two-phase binary counting stage which is based on the same circuit logic and has the same effect in operation as the above described counting stage. However, the stage according to FIG. 4 comprises as electrically controllable bistable circuit components a plurality of flip-flop stages of conventional type, each including two transistor gate circuits $T_{a2}$ and $\bar{T}_{a2}$ and $T_{b2}$ and $\bar{T}_{b2}$ and having output lines $A_2$ and $\bar{A}_2$ and $B_2$ and $\bar{B}_2$ and being provided each with two input lines $A_1$ and $\bar{A}_1$ and $B_1$ and $\bar{B}_1$. The functional interconnection of the components of this circuit in accordance with the above listed Boolean conditions is effected by means of conventional AND gates U and OR-gates Or composed of diode combinations. It should be noted that in this circuit arrangement equipped with PNP transistors the "no" conditions would correspond to a switched-off condition of the particular line (voltage O) while the "yes" condition would correspond to the presence of a negative potential of at least 6 volts in the particular line.

It is evident that purely electronic counting stages of this type entail a substantially higher counting speed than relay-equipped counting stages according to FIG. 1. It should be noted that in the arrangement according to FIG. 4 the inputs $A_1$ and $\bar{A}_1$ and $B_1$ and $\bar{B}_1$ have the same function as the relay coils $A_0$ and $B_0$, respectively, in the arrangement according to FIG. 1 while the outputs $A_2$ and $\bar{A}_2$ and $B_2$ and $\bar{B}_2$ have the same function as the relay coils $A_1$ and $B_1$, respectively, of FIG. 1. For the sake of completeness the diagram of FIG. 4 contains also a resetting line R passing through the whole length of the arrangement by means of which each binary counting stage may be reset to idle condition (O-condition).

It can be seen that the diagram of FIG. 4 does not include an impulse or signal generator but such a signal generator e.g. 1 as described and illustrated above may be connected with its output to the input $A_1$–$B_1$ of the stage according to FIG. 4. One of the lines of each pair thereof is always carrying a certain potential (L-condition) while the other line of the individual pair does not carry a potential (O-condition).

It has been mentioned further above that also three-phase signal generators according to FIG. 3 may be used. Analagously, counting chains comprising in each counting stage three direct current coupled bistable circuit components can be provided in which the bistable components are so interconnected logically that each counting stage again is able to act as a three-phase signal generator, however with a period duration twice as long as that of a preceding stage.

FIG. 5 illustrates an arrangement which comprises in addition to a signal generator IG a binary counting chain including a tetrade of four counting stages $BS_1$, $BS_2$, $BS_3$, and $BS_4$ with the interposition of an auxiliary control stage HST between the first and the second counting stage. For the sake of simplicity details of the generator and of the individual counting stages are not given, particularly the individual relay coils referred to above are not illustrated. The outputs $A_0$ and $B_0$, of the generator IG may be at a given moment either current carrying (L-condition) or without current (O-condition) so that in the manner described above for the combination signals, e.g., the sequence OOLL on output $A_0$, and the sequence OLLO on the output B, are possible. The binary counting stages may be constructed according to FIG. 1 or according to FIG. 4. Thus they may contain relay coils $A_1$, $B_1$; $A_2$, $B_2$ etc. which may be energized or de-energized and thus represent L-condition or O-condition.

The auxiliary control stage HST comprises according to FIG. 5 two bistable switching elements namely relay coils $B_3''$ and $B_4''$ which actuate each a pair of contacts $b_3$ and $b_4$, respectively. These relay coils $B_3''$ and $B_4''$ are energized only when the respectively associated outputs $B_3$, of the stage $BS_3$ and $B_4$, of the stage $BS_4$ carry a predetermined potential. The control stage HST has four inputs respectively connected with the outputs $A_0'$ and $B_0'$, of the generator IG and with the outputs $A_1'$ and $B_1'$ of the first counting stage $BS_1$. The control stage has further two outputs $A_1^*$ and $B_1^*$ which are connected with the inputs of the second counting stage $BS_2$.

The output lines $A_1^*$ and $B_1^*$ of the auxiliary control stage HST which at the same time constitute the inputs for the binary counting stage $BS_2$ are interconnected with the above mentioned inputs by the contacts of the above mentioned relays in accordance with the following Boolean conditions:

$$A_1^*=\bar{B}_3\bar{B}_4A'_1+A'_0(B_3+B_4)$$
$$B_1^*=\bar{B}_3\bar{B}_4B'_1+B'_0(B_3+B_4)$$

This means that the outputs $A_1^*$ and $B_1^*$ of the auxiliary control stage, i.e., the inputs of the second binary counting stage $BS_2$ are connected either with the outputs $A'_0$ and $B'_0$, respectively, of the signal generator IG, or with the outputs $A'_1$ and $B'_1$, respectively, of the first binary counting stage $BS_1$, depending upon whether at least one of the outputs $B_3'$ or $B_4'$ carries an operating potential or none of them does this. In other words, as long as the relay coils $B_3''$ and $B_4''$ are not energized, the conditions of the outputs $A_1^*$ and $B_1^*$ correspond exactly to the conditions of the outputs $A_1'$ and $B_1'$, respectively, of the first binary counting stage $BS_1$. As soon as relay coil $B_3''$ is energized (but $B_4''$ is not), or vice versa, i.e., either the connecting line $B_3$ or the connecting line $B_4$ carries an operative potential, the outputs $A_1^*$ and $B_1^*$ are connected directly with the outputs $A_0'$ and $B_0'$, respectively, of hte signal generator IG. Also when both relay coils $B_3''$ and $B_4''$ are simultaneously energized, the outputs $A_1^*$ and $B_1^*$ are connected with the generator outputs $A_0'$ and $B_0'$ respectively.

Thus it can be seen that FIG. 5 illustrates a tetrade of four binary counting stages plus one auxiliary control stage which arrangement is capable of storing any one of the decimal digits 0–9 in binary coded form. Thus the entire arrangement according to FIG. 5 can be used as a counting arrangement for one particular order of a decimal number.

The following chart will serve to illustrate the operation of an arrangement according to FIG. 5.

In the following column HST the signals appearing at the outputs $A_1^*$ and $B_1^*$, respectively, of the auxiliary control stage are listed in relation to the signals in the first two columns. It can be seen that the signal sequence ap-

| Decimal | IG | | $BS_1$ | | HST | | $BS_2$ | | $BS_3$ | | $BS_4$ | |
|---|---|---|---|---|---|---|---|---|---|---|---|---|
| Digits | $A_0'$ | $B_0'$ | $A_1'$ | $B_1'$ | $A_1^*$ | $B_1^*$ | $A_2'$ | $B_2'$ | $A_3'$ | $B_3'$ | $A_4'$ | $B_4'$ |
| 0 | O | O | O | O | O | O | O | O | O | O | O | O |
| | O | L | O | O | O | O | O | O | O | O | O | O |
| | L | L | O | L | O | L | O | O | O | O | O | O |
| | L | O | O | L | O | L | O | O | O | O | O | O |
| 1 | O | O | L | L | L | L | O | L | O | O | O | O |
| | O | L | L | L | L | L | O | L | O | O | O | O |
| | L | L | L | O | L | O | O | L | O | O | O | O |
| | L | O | L | O | L | O | O | L | O | O | O | O |
| 2 | O | O | O | O | O | O | L | L | O | L | O | O |
| | O | L | O | O | O | L | L | L | O | L | O | O |
| | L | L | O | L | L | L | L | O | O | L | O | O |
| | L | O | O | L | L | O | L | O | O | L | O | O |
| 3 | O | O | L | L | O | O | O | O | L | L | O | L |
| | O | L | L | L | O | L | O | O | L | L | O | L |
| | L | L | L | O | L | L | O | L | L | L | O | L |
| | L | O | L | O | L | O | O | L | L | L | O | L |
| 4 | O | O | O | O | O | O | L | L | L | O | O | L |
| | O | L | O | O | O | L | L | L | L | O | O | L |
| | L | L | O | L | L | L | L | O | L | O | O | L |
| | L | O | O | L | L | O | L | O | L | O | O | L |
| 5 | O | O | L | L | O | O | O | O | O | O | L | L |
| | O | O | L | L | O | L | O | O | O | O | L | L |
| | L | O | L | O | L | L | O | L | O | O | L | L |
| | L | O | L | O | L | O | O | L | O | O | L | L |
| 6 | O | O | O | O | O | O | L | L | O | L | L | L |
| | O | L | O | O | O | L | L | L | O | L | L | L |
| | L | L | O | L | L | L | L | O | O | L | L | L |
| | L | O | O | L | L | O | L | O | O | L | L | L |
| 7 | O | O | L | L | O | O | O | O | L | L | L | O |
| | O | L | L | L | O | L | O | O | L | L | L | O |
| | L | L | L | O | L | L | O | L | L | L | L | O |
| | L | O | L | O | L | O | O | L | L | L | L | O |
| 8 | O | O | O | O | O | O | L | L | L | O | L | O |
| | O | L | O | O | O | O | L | L | L | O | L | O |
| | L | L | O | L | O | L | L | L | L | O | L | O |
| | L | O | O | L | O | L | L | L | L | O | L | O |
| 9 | O | O | L | L | L | L | L | O | L | O | L | O |
| | O | L | L | L | L | L | L | O | L | O | L | O |
| | L | L | L | O | L | O | L | O | L | O | L | O |
| | L | O | L | O | L | O | L | O | L | O | L | O |

In the above chart the first column marked IG shows in vertical arrangement a sequence of ten combination signals following each other in the sequence of increasing decimal digits as marked at the left hand margin, each combination signal being composed by two sequences of signals $A_0'$ and $B_0'$ appearing at the so marked outputs i.e. as energization and de-energization of the relay coils $A_0$ and $B_0$, respectively of the generator IG. The individual signal sequences are those specified further above. The next column $BS_1$ contains the signals appearing at the output of the first counting stage in the form of energization of the relay coils $A_1'$ and $B_1'$. As can be seen, in accordance with the explanation given with reference to FIG. 1 and 2 the duration of the signals and signal cycles appearing in column $BS_1$ is doubled against the duration of the signals and cycles in the column IG.

pearing at the output of the control stage is either equal to that issued by the first counting stage $BS_1$ (for decimal digits 0, 1, 8 and 9) or it is equal to those issued by the signal generator IG (for decimal digits 2, 3, 4, 5, 6 and 7). These identities are marked in the chart by vertical lines along the respective combination signals. The remaining columns $BS_2$, $BS_3$ and $BS_4$ contain the corresponding combination signals appearing at the outputs of the remaining counting stages or represented by the energization of the respective relay coils $A_2'$, $B_2'$; $A_3'$, $B_3'$; $A_4'$, $B_4'$, respectively.

Assuming that in the arrangement according to FIG. 5 indicating lights are connected in parallel with the relay coils $A_1'$, $A_2'$, $A_3'$ and $A_4'$ of the four counting stage in a manner similar to that illustrated by FIG. 1a, and if it is further assumed that energization and deenergization of the relay coils just mentioned corresponds to the representation of the binary digit L or O, respectively, then it can be seen that as the operation would proceed from decimal digit 0 up to the decimal digit 9, with each counting step a binary number is stored or indicated in the tetrade of four binary counting stages as indicated by underscoring in the columns $BS_1$–$BS_4$ the first signal (O or L) of each signal sequence in the column designated by $A_1'$, $A_2'$, $A_3'$ and $A_4'$. It will be found that the underscored group of four binary digits in each horizontal row corresponds exactly to the binary code for decimal digits given further above and in each row represents the numerical value of the corresponding decimal digit marked at the left hand margin.

Figure 6:
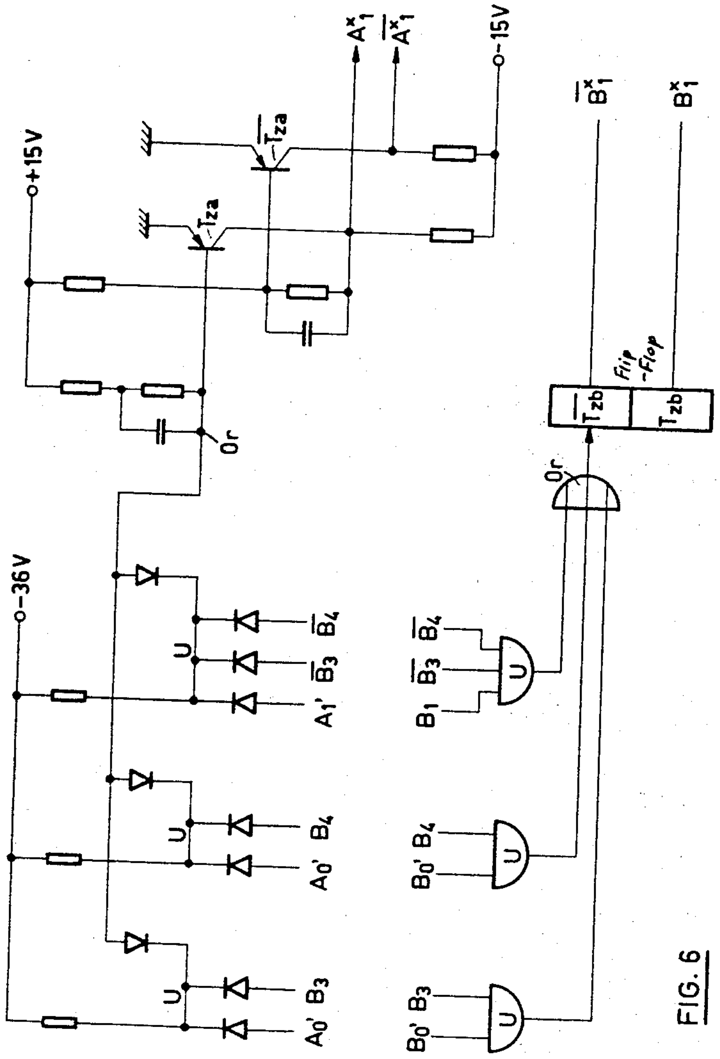
FIG. 6 is a schematic circuit diagram illustrating an alternative form of the auxiliary control circuit included in FIG. 5.

FIG. 6 illustrates an alternative for the auxiliary control stage HST of FIG. 5. Instead of relays including relay coils and relay contacts shown in FIG. 5, the control stage according to FIG. 6 is a purely electronic arrangement comprising AND-gate circuits U and OR-gate circuits Or, said gate circuits being composed in well known manner of diode circuit arrangements which influence bistable flip-flop circuits comprising transistors $T_{za}$, $\overline{T}_{za}$ and $T_{zb}$, $\overline{T}_{zb}$, as shown.

The operation of the auxiliary control stage according to FIG. 6 is entirely the same as that of the circuit or stage shown in FIG. 5. The outputs $A_1^*$, $\overline{A}_1^*$ and $B_1^*$, $\overline{B}_1^*$, respectively, are controlled by the respectively associated pairs of control transistors mentioned above. In each pair of control transistors the condition of conductivity of one of the transistors is always opposite to that of the other transistor, i.e. the condition of conductivity of the control transistor $\overline{T}_{za}$ is the opposite of the condition of the associated transistor $T_{za}$, and vice versa.

The reference letters designating the various inputs and outputs are purposely the same which have been used in FIG. 5 so that under these circumstances it can be seen that the circuit according to FIG. 6 also satisfies the condition in Boolean terms given above in reference to FIG. 5.

FIG. 7 illustrates a further development of the invention which combines in one pair of outputs $X_0$ and $Y_0$ additively or subtractively the two-phase combination signals furnished by two separate signal generators $IG_1$ and $IG_2$, respectively, at their outputs i.e. by energization of the relay coils A, B and C, D, respectively. A two-phase adder ADD is interposed for this purpose between the signal generators $IG_1$ and $IG_2$ and the outputs $X_0$ and $Y_0$. The signal generators may be of the same type as illustrated in FIG. 1. The function of the two-phase adder is the exact counterpart of a mechanical differential gear of conventional type having two input shafts and one output shaft. The rotational movements of one input shaft of the gear corresponds to the combination signals appearing at the outputs A, B of the first signal generator $IG_1$, while the rotary movement of the second input shaft correspond to the combination signals appearing at the outputs C, D of the second signal generator $IG_2$, and the resulting rotary movements of the output shaft of the differential gear correspond to the output signal combinations which appear at the outputs $X_0$ and $Y_0$ of the adder.

As can be seen from FIG. 8 explained further below the output signals appearing at the outputs $X_0$ and $Y_0$ of the adder may be applied to a binary counting chain similar to that shown in FIG. 5. Arrangements according to FIGS. 7 and 8 are useful and advisable for determining by a counting or algebraic adding operation variable difference values between a variable target value or predetermined value of a quantity and a likewise variable actual value of that particular quantity to be monitored. The resulting variable difference value may also be counted or algebraically added in a two-phase adding apparatus according to FIGS. 1 or 4, and may, if desired, be converted into an analog value so as to be utilized as a control value actuating an adjusting or regulating device whereby the actual values of the respective quantity are automatically influenced so as to approach or coincide with the predetermined or target value thereof.

The logical interconnection of the outputs $X_0$, $Y_0$ with the adder inputs i.e. the outputs A, B and C, D, respectively, of the signal generators $IG_1$ and $IG_2$, respectively, within the two-phase adder ADD comprising relay coils X, Y and respectively associated relay contacts *a*, *b*, *c*, *d*, as shown in FIG. 7, satisfies the following conditions in terms of Boolean algebra:

$$X_0=A\overline{C}\,\overline{D}+B\overline{C}D+\overline{A}CD+\overline{B}C\overline{D}$$

$$Y_0=\overline{A}\,\overline{B}D+\overline{A}B\overline{C}+AB\overline{D}+A\overline{B}C$$

The same would apply also to an interconnection according to the following terms:

$$X_0=\overline{A}\,\overline{B}C+\overline{A}BD+AB\overline{C}+A\overline{B}\,\overline{D}$$

$$Y_0=B\overline{C}\,\overline{D}+A\overline{C}D+\overline{B}CD+AC\overline{D}$$

In order to explain the operation of the arrangement according to FIG. 7 reference is made to the diagrams of FIGS. 7*a*, 7*b*.

The diagram of FIG. 7*a* is presented as an introduction because actually the diagram of FIG. 7*a* illustrates rather the operation of the basic arrangement according to FIG. 1. In FIG. 7*a* the abscissa is time, while the ordinates of the graph $G_1$ are shown as increasing and decreasing by uniform increments *dy* so that the graph $G_1$ illustrates the above mentioned changes of a variable quantity as time passes. The ordinate *p* corresponds to one complete rotation of the wiper arm K*g* of the signal generator according to FIG. 1 i.e. to a combination signal composed of a sequence of four signal combinations numbered 1, 2, 3, 4 in FIG. 7*a*. However, while FIG. 2 is based on the assumption that the variable quantity being monitored changes only in one direction and continuously at the same speed, it can be seen that the more general condition illustrated by the graph $G_1$ illustrates the changes of the variable quantity occurring at varying speeds or intervals and not always occurring in the same direction.

Above the graph $G_1$ two horizontal diagrams are shown which illustrate the signal sequences $D_{a0}$ and $D_{b0}$ corresponding in their detail arrangement and configuration exactly to the shape of the graph $G_1$. Above the last mentioned diagrams a row of plus and minus signs is shown which is intended to indicate the changing positive or negative direction of the individual change steps illustrated by the graph $G_1$. If during the operation of the arrangement the number of change steps *dy* are algebraically counted depending upon whether they are positive or negative, then the counting results marked along the top of FIG. 7*a* will result. This means that at any time during the operation the momentary magnitude of the monitored quantity relative to a starting value 0 will be indicated.

It can be seen clearly from this diagram that each change of the output signals $D_{a0}$ and $D_{b0}$, respectively, between 0 and a reference value not only constitutes the indication of a change step *dy* of the monitored quantity represented by the curve $G_1$ but that it also indicates in which direction such change step has taken place. The rule is simply that as long as the individual signals $D_{a0}$ and $D_{b0}$ change alternatingly i.e. one after the other, the direction of the particular change step remains unchanged i.e. either positive or negative as the case may be. However, whenever one of the two signals, either $D_{a0}$ or $D_{b0}$, changes in sucession between 0 and its reference value or back to 0 without the other signal having changed in the same manner meanwhile, then this condition indicates that the direction of the change step has changed.

The diagram of FIG. 7*b* is constructed on the same principle except that it concerns and illustrates the operation of an arrangement according to FIG. 7.

In the bottom portion of FIG. 7*b* two graphs $G_1$ and $G_2$ are shown which illustrate the positive and negative changes of two variable quantities which changes are represented by the output signals A, B and C, D, respectively, issued by the signal generator $IG_1$ and $IG_2$, respectively, and illustrated accordingly by the diagrams so designated along the top of FIG. 7*b*. At the outputs $X_0$ and $Y_0$ of the adder ADD will then appear signal sequences as illustrated by the diagrams $X_0$, $Y_0$ of FIG. 7*b*. This sequence of signals corresponds exactly to the third graph $G_1+G_2$ shown in the lower portion of FIG. 7*b* and representing at every distance the algebraic sum of the ordinates of the graphs $G_1$ and $G_2$.

It can be seen that any change step of either one of the two variable quantities being monitored is truly represented in the output signals $X_0$, $Y_0$, concerning the occurrence of the individual step as well as concerning its positive or negative direction. It can also be seen from FIG. 7*b* that if one of the signal generators is standing still, the output signal of the other signal generator appears unchanged at the outputs $X_0$, $Y_0$.

Finally FIG. 9 illustrates only the alternative to the two-phase adder ADD of FIG. 8 by replacing the relay and contact arrangement of FIG. 7 by an equivalent electronic arrangement comprising in a manner similar to that described with reference to FIG. 6 electronic adding circuits composed of AND-gate circuits U and OR-gate circuits OR and two flip-flop stages X, $\bar{X}$ and Y, $\bar{Y}$ The function of the electronic adder according to FIG. 9 is entirely analogous to that of the relay type adder of FIG. 7 and therefore evidently does not require a detailed description.

It will be noted that in all the FIGURES 4–9 with the exception of the diagrams FIGS. 7*a* and 7*b* signal lights are shown without detailed description, but corresponding to the signal lights shown in FIGS. 1 and 1*a* and for the same purpose as described in reference to the last mentioned illustrations.

For the sake of completeness the following may be added. In the arrangement according to FIG. 4 the binary counting stage illustrated thereby and for all the consecutive similar counting stages provided that a counting chain of such stages is formed, a common re-set line R is provided by means of which all the counting stages of the chain may be re-set to O position simultaneously and jointly. However the arrangement could be modified without difficulty in such a manner that a second re-set input is provided for placing both flip-flop components into "yes" condition (L-condition). Then it would be possible in a conventional manner to set by means of a presetting arrangement the entire counting chain to any desired numerical or binary storage content after which the counting procedure would start from this stored content in forward or rearward direction, i.e., additively or subtractively depending upon the positive or negative nature and the number of combination signals introduced into the arrangement.

FIG. 8 referred to above hardly requires further explanation in view of the above. However, it should be noted that FIG. 8 shows an arrangement comprising several counting stages of which two stages $DS_1$ and $DS_2$ are shown. These stages act in the manner described above as generators for two-phase signal sequences $X_0'$ and $Y_0'$ or $X_0''$ and $Y_0''$, respectively, of the same type and signal sequence as the input combination signals $X_0$ and $Y_0$, with the only difference that the cycle durations are increased at the ratio of 1:10 and 1:100, respectively.

As mentioned further above it could occur that in the operation of arrangements according to FIGS. 7–9 the two separate signal generators $IG_1$ and $IG_2$ furnish identical signals coincidently in which case of course difficulties would result because there would not be any certainty as to which one of the circuit components would respond to which signal. FIGS. 10 and 11 illustrate an improved arrangement according to the invention which is insensitive to coincidence of pairs of input signals A, B and C, D, in other words, an arrangement which operates properly even in the case of such a coincidence.

FIG. 10 illustrates one portion of such an arrangement which is assumed to be supplied with input signals A, B, C, D, from the impulse generator as shown at the left hand of FIGS. 7–9. The arrangement according to FIG. 10 comprises four identical circuit arrangements $N_a$, $N_b$, $N_c$ and $N_d$, however, of these circuit arrangements the last three mentioned above are shown only in block form because they are entirely identical with the circuit arrangement $N_a$ which is shown in complete detail. FIG. 10 shows the inputs of the above mentioned signals A–D furnished by the two increment signal generators.

Each of these circuit arrangements comprises a delay circuit $N_v$ of conventional type which derives from the respective input signal e.g. from signal A a secondary signal $A_v$ ($B_v$, $C_v$ and $D_v$, respectively, in the other circuits) delayed a predetermined interval after the respective primary or original signal. The now existing pair of signals e.g. A and $A_v$ is applied both to a diode type AND-gate U and to a diode type OR-gate Or as shown. The output signals of these gates are symbolized by $A+A_v$ and $\overline{\bar{A}+\bar{A}_v}=A.A$, respectively, and are taken to two flip-flop stages $F_1$ and $F_2$, respectively of conventional type and comprising each two transistors $T_{11}$, $T_{12}$ and $T_{21}$, $T_{22}$ respectively. It does not appear to be necessary to describe these conventional circuits in detail. It will be readily understood by those skilled in the art that by operation of the just described circuit arrangements $N_a$, $N_b$, $N_c$ and $N_d$ each of these circuit arrangements produces a pair of auxiliary signals Q, S, P, W, R, T, V, Z and their negated or inverted values in such a manner that each of these auxiliary signals is defined by a corresponding logical linkage with the above mentioned original input signals A, B, C, D and with the corresponding delayed auxiliary signals $A_v$, $B_v$, $C_v$, $D_v$, respectively as indicated herebelow:

$$Q=A+A_v \qquad R=\bar{A}+\bar{A}_v=\overline{A.A_v}$$
$$S=B+B_v \qquad T=\bar{B}+\bar{B}_v=\overline{B.B_v}$$
$$P=C+C_v \qquad V=C+C_v=\overline{C.C_v}$$
$$W=D+D_v \qquad Z=\bar{D}+\bar{D}_v=\overline{D.D_v}$$

The corresponding negated values are formed in an analogous manner.

The above mentioned output signals of the circuit arrangements shown in FIG. 10 are fed as they occur into a second portion of the arrangement as illustrated by FIG. 11. The arrangement according to FIG. 11 is composed as can be seen of a plurality of AND-gates U constituting a first OR-gate Or' and another plurality of AND-gates U constituting a second OR-gate Or'' as illustrated. The various AND-gates of FIG. 11 are connected with the outputs P–Z, respectively, of the arrangement according to FIG. 10 as indicated in FIG. 11. For the sake of simplicity of the illustration most of the AND-gates are shown only diagrammatically except for the upper two gates in the right hand column thereof where the conventional structure of these gates is illustrated in detail. The above mentioned OR-gates Or' and Or'' deliver their output signals into conventional flip-flop circuits $F_3$ and $F_4$, respectively. The flip-flop circuit $F_3$ is illustrated in detail while the other circuit $F_4$ is illustrated only diagrammatically because it is otherwise entirely identical with $F_3$. At the outputs of these flip-flop circuits appear in operation of the arrangement the desired output signals X and Y or their respective negated values in accordance with the following Boolean equations:

$$X=\bar{R}S\bar{P}+R\bar{T}\bar{Z}+\bar{Q}T\bar{V}+Q\bar{S}\bar{W}+\bar{R}TZV+R\bar{S}PZ+\bar{Q}SWP+Q\bar{T}VW$$

$$Y=\bar{R}S\bar{W}+R\bar{T}\bar{P}+\bar{Q}T\bar{Z}+Q\bar{S}\bar{V}+\bar{R}TZP+R\bar{S}PW+\bar{Q}SWV+Q\bar{T}VZ$$

These or analogous linkage equations determine the linkage between the output signals X and Y on one hand, and the signal pairs A, $A_v$; B, $B_v$; C, $C_v$; D, $D_v$, derived from the actual input signals A, B, C, D, respectively, and the resulting auxiliary signals Q, R, S, T, P, V, W, Z, respectively, derived therefrom with results which can be read from the following chart wherein at the intersection of each row and column the signal pair X, Y is marked which results from the input of signals A, B marked in line with the particular column and of the signals C and D marked in line with the particular row, together with the respectively corresponding auxiliary signals. It can be seen that even in the case of a coincidence of input signal pairs A, B and C, D a predetermined output signal X, Y is produced unequivocally.

kinds of transitions between such input signal combinations, as is shown herebelow:

| A | A | B | B | | AB AB |
|---|---|---|---|---|---|
| O | O | O | O | Static cond. | OO |
| O | O | L | O | Transition | OO to OL. |
| O | O | O | L | do | OL to OO. |
| O | O | L | L | Static cond. | OL |
| L | O | L | L | Transition | OL to LL. |
| O | L | L | L | do | LL to OL. |
| L | L | L | L | Static cond. | LL |
| L | L | O | L | Transition | LL to LO. |
| L | L | L | O | do | LO to LL. |
| L | L | O | O | Static cond. | LO |
| O | L | O | O | Transition | LO to OO. |
| L | O | O | O | do | OO to LO. |

Thus it can be seen that the logical circuit arrange-

| C $C_v$ D $D_v$ | P V W Z | A $A_v$ B $B_v$: O O O O<br>Q R S T: O L O L | A $A_v$ B $B_v$: O O L O / O O O L<br>Q R S T: O L L L | A $A_v$ B $B_v$: O O L L<br>Q R S T: O L L O | A $A_v$ B $B_v$: L O L L / O L L L<br>Q R S T: L L L O | A $A_v$ B $B_v$: L L L L<br>Q R S T: L O L O | A $A_v$ B $B_v$: L L O L / L L L O<br>Q R S T: L O L L | A $A_v$ B $B_v$: L L O O<br>Q R S T: L O O L | A $A_v$ B $B_v$: O L O O / L O O O<br>Q R S T: L L O L |
|---|---|---|---|---|---|---|---|---|---|
| O O O O | O L O L | OO | OO | OL | OL | LL | LL | LO | LO |
| O O L O<br>O O O L | O L L L | OO | OL | OL | LL | LL | LO | LO | OO |
| O O L L | O L L O | OL | OL | LL | LL | LO | LO | OO | OO |
| L O L L<br>O L L L | L L L O | OL | LL | LL | LO | LO | OO | OO | OL |
| L L L L | L O L O | LL | LL | LO | LO | OO | OO | OL | OL |
| L L O L<br>L L L O | L O L L | LL | LO | LO | OO | OO | OL | OL | LL |
| L L O O | L O O L | LO | LO | OO | OO | OL | OL | LL | LL |
| O L O O<br>L O O O | L L O L | LO | OO | OO | OL | OL | LL | LL | LO |

It can be seen from the above that by additional use of delayed auxiliary signals a clear distinction is obtained not only between static conditions of the input signal combinations A, B and C, D, but also between different ments according to FIGS. 10 and 11 taken together are capable of discriminating not only between four static conditions of the pairs of signals A, B (or C, D) but additionally also between eight temporary conditions or rather conditions which are possible between different static conditions of A, B (or C, D). In other words, four of the possible combinations of A, $A_v$, B, $B_v$ correspond to four respectively different static conditions A, B, and the remaining eight possible different combinations A, $A_v$, B, $B_v$ correspond to eight respectively different transitions between different conditions A, B.

The above mentioned predetermined delay applied to the input signals A, B, C, D, respectively, by the respective delay circuits $N_v$ for producing the auxiliary delayed signals $A_v$, $B_v$, $C_v$ and $D_v$, respectively, has to be selected in accordance with the following rules:

(a) The delay period must be longer than the limit of time resolution i.e. than the shortest period of time required for an operative step in any counting or storing device supplied with the output signals issued by the counting or increment adding arrangement according to the invention; therefore the limit of the delay interval would probably be of the order of 1–2 microseconds;

(b) The delay period must however be smaller than the duration of the shortest signal periods constituting a fraction of a complete cycle of signals and therefore corresponding to one of the above mentioned fractional increments of the magnitude $I/4$ i.e. in the present example one quarter of an increment unit I. This would mean that the delay period must be shorter than 8.3 microseconds if in the case of a counting frequency of 120 kilocycles per second 120,000 increment signals per second have to be processed.

Referring now to FIG. 12 it will be shown that the basic principle of the invention is very advantageously applicable to a position control apparatus. Such an apparatus as illustrated would have the task of producing an angular displacement of a shaft $y$ by means of a servo motor $My$ corresponding to an angular displacement of a shaft $x$ actuated or operated by an angular-position data originator $Gx$. FIG. 12 shows diagrammatically that the input shaft $x$ is operatively connected with an increment signal generator $IGx$ which may be of the type illustrated in FIG. 1. The angular displacement of the input shaft $x$ constitutes a variable input quantity X which is quantized by the increment signal generator $IGx$ i.e. is converted into increment representing signals $Ix$ in the manner described at the outset of the specification. In a similar manner the servo motor $My$ is operatively connected by its shaft $y$ with a similar or analogous increment signal generator $IGy$ which converts in the same manner the angular displacements of the output shaft $y$ i.e. a variable output quantity Y by quantization into increment representing signals $Iy$ in the same manner as described above. In the same manner as described in reference to FIG. 7 the outputs of the two increment signal generators $IGx$ and $IGy$ furnishing the increment representing signals $Ix$ and $Iy$, respectively, are connected with a two-phase adding stage or increment adder IA analogous or equal to the similar device ADD in FIG. 7. In order to obtain as a result of the addition the difference $Ix-Iy$ i.e. the sum of $Ix$ and $-Iy$ the output lines from the generator $IGy$ are crossed so that the inverted signal value minus $Iy$ is introduced into the adder IA.

It is easy to understand that the difference $Ix-Iy$ represents the momentary value of an existing angular difference between the angular displacement of the input shaft $x$ and the angular displacement of the output shaft $y$. The signals representing this error or difference are introduced into an error storage device FSW as positive or negative values depending upon whether in terms of the angular values involved $Ix$ is larger or smaller than $Iy$. In a manner analogous to the system illustrated by FIGS. 4 or 5 the storage device FSW may comprise four stages from each of which a signal may be derived which represents the momentary condition of the particular stage. It is to be borne in mind that in this manner the conditions simultaneously existing in the four stages corresponds to a storage of the momentary difference between the target quantity X at the input and the actual quantity Y at the output. In a well known manner the indications or signals derived from the stages of the error storage FSW are transmitted to a conventional digital-analog-converter DAW which produces an analog voltage $U_{(x-y)}$ which is then applied via an amplifier as shown to the servo-motor $M_y$ in a well known manner to the effect that the existing difference $X-Y$ is reduced by corresponding actuation of the servo-motor towards zero.

FIG. 13 illustrates a further advantageous application of an increment signal adder and an increment signal generator according to the invention. The illustrated arrangement serves the purpose of deriving from three independently variable quantities $x$, $y$ and $z$ an output quantity of the form $Ax+By+Cz$. However, it is to be understood that the input quantities $x$, $y$ and $z$ need not be variable independently from each other but may also have functional relations between each other. As can be seen from FIG. 13 the arrangement comprises three increment signal generators $IGx$, $IGy$ and $IGz$ preferably of the type described above in reference to FIG. 1, each of these generators being actuated by some suitable input device e.g. by a corresponding operatively connected hand wheel adapted to effect the input of a respective input signal $x$, $y$ or $z$ as indicated in the drawing by the reference characters $x$, $y$ and $z$ next to the respective hand wheels.

By introducing the outputs of the increment signal generators $IGx$, $IGy$ and $IGz$ into a decimal counting arrangement DSW via interposed selected combinations of increment adders IA as described above and conventional binary value reduction stages BS, or with the aid of decimal value reduction stages DS, the desired result is obtained in a very simple manner. From the input quantities $x$, $y$ and $z$ represented by the signals $Ix$, $Iy$ and $Iz$, respectively, an output quantity $Ax+By+Cz$ is obtained. In the present example the factor A would be $-1/8$, B would be $1/2$, and the factor C would be 1. This is achieved by placing two binary value reduction devices BS, each producing a reduction at the rate 2:1, between the generator $IGx$ and a first binary increment adder IA and by crossing the connection between the second reduction device BS and the adder IA in order to make the input into the latter negative, further by directly connecting the second signal generator $IGy$ with the first adder IA and inserting another binary value reduction device BS operating at a rate of 2:1 between said adder IA and a second similar adder IA which receives the output of the third increment signal generator $IGz$ directly. The output of the second adder IA which is the desired sum as specified above is then furnished to the decimal counter DSW for further processing.

It will be understood that each of the elements described above, or two or more together, may also find a useful application in other types of apparatus for forming the algebraic sum of digits each representing a unit value differing from the types described above.

While the invention has been illustrated and described as embodied in apparatus for forming the algebraic sum of digits each representing a unit value of change steps occurring within a change in positive or negative direction of a variable quantity, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Logic network means for use with multiphase binary signal generator means which, for a continuous change of a physical quantity, are adapted to generate a primary combination signal consisting of a first predetermined cyclic sequence of possible signal combinations for a positive unit change of said quantity and a second sequence for a negative unit change of said physical quantity, comprising, in combination, a plurality of input lines corresponding in number to the number of phases of sad primary combination signal; a plurality of output lines corresponding in number to the number of said input lines; and a plurality of bistable switching means direct-current coupled and logically interconnected both mutually and to said input lines and output lines, in such a manner that a secondary combination signal is generated, said secondary combination signal having the same number of phases and the identical sequence of binary signal combinations as said primary combination signal, but a secondary period which is an integral multiple of said primary combination signal period.

2. Logic network means as set forth in claim 1, wherein each individual change of signal combinations signifies a change of said quantity corresponding to a fraction of said unit change.

3. Logic network means as set forth in claim 1, wherein said bistable elements are hydraulic elements.

4. Logic network means as set forth in claim 1 wherein said bistable elements are eletcric elements.

5. Logic network means as set forth in claim 1, wherein said primary combination signal is a two-phase binary signal sequence; wherein said integral multiple is a multiple of two; wherein said plurality of input lines comprises two input lines; wherein said plurality of output lines comprises two output lines; and wherein said plurality of bistable switching elements is arranged to form two bistable circuits, which are mutually direct-current coupled, and also direct-current coupled to said two input lines and said two output lines, and logically connected with direct-current coupling in such a manner as to satisfy simultaneously the following pairs of Boolean equations:

$$A_a = \overline{B}_e \cdot (A_e \cdot \overline{B}_a + \overline{A}_e \cdot B_a) + A_a$$

$$\overline{A}_a = \overline{B}_e \cdot (A_e \cdot B_a + \overline{A}_e \cdot \overline{B}_a) + \overline{A}_a$$

$$B_a = B_e \cdot (A_e \cdot \overline{A}_a + \overline{A}_e \cdot A_a) + B_a$$

$$\overline{B}_a = B_e \cdot (A_e \cdot A_a + \overline{A}_e \cdot \overline{A}_a) + \overline{B}_a$$

wherein $A_e$, $B_e$ and $A_a$, $B_a$ respectively signify the instantaneous conditions of said input lines and said output lines and wherein $\overline{A}_e$, $\overline{B}_e$ and $\overline{A}_a$, $\overline{B}_a$ signify the corresponding inverse (NOT) conditions.

6. A plurality of logic network means as set forth in claim 1, wherein the output lines of one of said networks comprise the input lines of a following similar network, and wherein said plurality of networks is direct-current coupled and logically interconnected in such a manner as to constitute a forward-backward counter.

7. A plurality of logic network means as set forth in claim 1, wherein said primary combination signal is a two-phase binary signal sequence; wherein said integral multiple is a multiple of two; wherein a first, second, third and fourth of said logic networks generating secondary, third and fourth combination signals respectively are connected in series; and also comprising an auxiliary control stage adapted to select ten of the possible sixteen combination conditions of said four logic networks for further processing, the combination of said four logic networks and said auxiliary control stage being interconnected in such a manner as to form a decade forwards-backwards counter.

8. Logic network means as set forth in claim 7, wherein said auxiliary control stage comprises a two-phase switching arrangement, which is adapted, under the control of said third or fourth combination signal, to alternately conduct either said primary combination signal or said secondary combination signal to said second logic network in such a manner that the combination of conditions of said bistable switching elements in one phase of said four logic networks correspond to the ten decimal digits according to the following table:

| Decimal digit | Value | | | |
|---|---|---|---|---|
| | 4 | 2 | 2 | 1 |
| | Switching elements | | | |
| | $A_4$ | $A_3$ | $A_2$ | $A_1$ |
| 0 | O | O | O | O |
| 1 | O | O | O | L |
| 2 | O | O | L | O |
| 3 | O | L | O | L |
| 4 | O | L | L | O |
| 5 | L | O | O | L |
| 6 | L | O | L | O |
| 7 | L | L | O | L |
| 8 | L | L | L | O |
| 9 | L | L | L | L |

9. Logic network means as set forth in claim 7, wherein said auxiliary control stage is connected between said first and second logic networks of said group of four logic networks which are connected together to form said decade counting stage; and wherein said auxiliary control stage generates control output signals ($A_1^*$, $B_1^*$) said control output signals being a function of said third and fourth combination signals ($B_3$, $B_4$), and said primary and secondary signals ($A_0$, $B_0$; $A_1$, $B_1$ respectively) as follows:

$$A_1^* = A_1 \cdot \overline{B}_3 \cdot \overline{B}_4 + A_0 \cdot (B_3 + B_4)$$
$$B_1^* = B_1 \cdot \overline{B}_3 \cdot \overline{B}_4 + B_1 \cdot (B_3 + B_4)$$

10. Logic network means for use with a first and a second multiphase binary signal generators, said first and second multiphase binary signal generators being adapted to generate a first and second primary combination signal respectively, said signals consisting of a first predetermined cyclic sequence of possible signal combinations for a positive unit of change of a physical quantity to be measured, and a second sequence for a negative unit change of said physical quantity, comprising, in combination a first plurality of input lines for receiving said first primary combination signal; a second plurality of input lines for receiving said second primary combination signal; and logic means connected with direct-current coupling throughout and logically connected in such a manner that for said two mutually independent primary combination signals appearing on said first and second plurality of input lines respectively, a secondary combination signal is generated which represents an addition of said two primary combination signals, said addition bearing the correct sign, said additional logic means thus effectively constituting an incremental adder.

11. Logic network means as set forth in claim 10 for processing of two primary combination signals, each of said signal sequences being two-phase, wherein said incremental adder means comprise direct-current coupled means adapted to simultaneously satisfy the following Boolean equations:

$$X = A \cdot \overline{C} \cdot \overline{D} + \overline{A} \cdot C \cdot D + B \cdot \overline{C} \cdot D + \overline{B} \cdot C \cdot \overline{D}$$
$$Y = A \cdot B \cdot \overline{D} + A \cdot \overline{B} \cdot C + \overline{A} \cdot \overline{B} \cdot D + \overline{A} \cdot B \cdot \overline{C}$$

wherein X, Y comprise the secondary combination signal and A, B and C, D respectively, comprise said first and second primary combination signals.

References Cited

UNITED STATES PATENTS

| | | | |
|---|---|---|---|
| 2,729,774 | 1/1956 | Steele. | |
| 2,823,345 | 2/1958 | Ragland | 318—20.310 X |
| 3,069,608 | 12/1962 | Forrester. | |
| 3,079,522 | 2/1963 | McGarrell. | |

MAYNARD R. WILBUR, *Primary Examiner.*

G. J. MAIER, *Assistant Examiner.*